(12) United States Patent
Masuda et al.

(10) Patent No.: US 10,018,781 B1
(45) Date of Patent: Jul. 10, 2018

(54) FLUID CONTROL STRUCTURE

(71) Applicant: INTERNATIONAL BUSINESS MACHINES CORPORATION, Armonk, NY (US)

(72) Inventors: Koji Masuda, Kawasaki (JP); Masao Tokunari, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/400,120

(22) Filed: Jan. 6, 2017

(51) Int. Cl.
G02B 6/26 (2006.01)
G02B 6/12 (2006.01)
G02B 6/13 (2006.01)

(52) U.S. Cl.
CPC ..... *G02B 6/12002* (2013.01); *G02B 6/12004* (2013.01); *G02B 6/13* (2013.01); *G02B 2006/12102* (2013.01); *G02B 2006/12104* (2013.01)

(58) Field of Classification Search
CPC .................................................. G02B 6/12002
See application file for complete search history.

(56) References Cited

U.S. PATENT DOCUMENTS

| | | | |
|---|---|---|---|
| 6,406,196 B1 * | 6/2002 | Uno ................... | G02B 6/12007 385/47 |
| 7,123,798 B2 * | 10/2006 | Fukuyama ........... | G02B 6/3636 385/47 |
| 7,195,402 B2 * | 3/2007 | Fukuyama ........... | G02B 6/4214 385/49 |
| 7,324,729 B2 * | 1/2008 | Fukuyama ........... | G02B 6/4246 385/15 |
| 2013/0280492 A1 | 10/2013 | Rossi et al. | |
| 2014/0241733 A1 * | 8/2014 | Moriyama ........... | G02B 6/4206 398/138 |
| 2015/0148689 A1 | 5/2015 | Jono et al. | |
| 2015/0355409 A1 * | 12/2015 | Yanagisawa ........... | G02B 6/322 385/14 |
| 2016/0091667 A1 | 3/2016 | Nishizawa et al. | |
| 2016/0313517 A1 * | 10/2016 | Yamamoto ........... | G02B 6/4214 |
| 2016/0313519 A1 * | 10/2016 | Yanagisawa ......... | G02B 6/4244 |
| 2017/0059790 A1 * | 3/2017 | Koyama ................ | G02B 6/421 |
| 2017/0123170 A1 * | 5/2017 | Furuya .................. | G02B 6/421 |

\* cited by examiner

*Primary Examiner* — Sung Pak
(74) *Attorney, Agent, or Firm* — Tutunjian & Bitetto, P.C.; Vazken Alexanian

(57) ABSTRACT

An optical structure includes a substrate having a cavity on a first surface of the substrate, an optical component on the substrate, and an adhesive infiltrating into a gap between the substrate and the optical component to fix the optical component to the substrate. The optical component includes a recess on a second surface of the optical component, the second surface being opposed to the substrate, and the recess covers an opening of the cavity of the substrate.

16 Claims, 26 Drawing Sheets

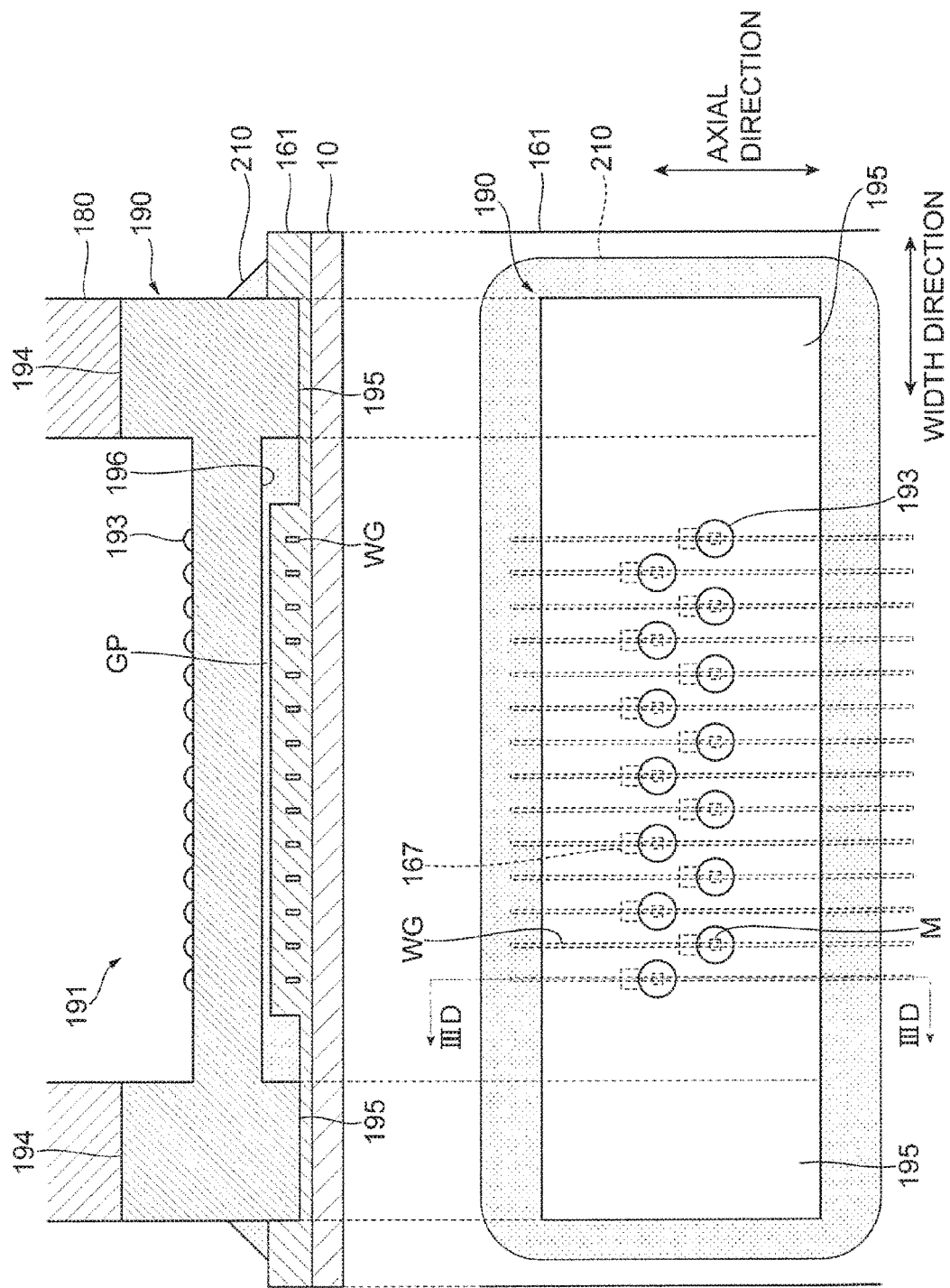

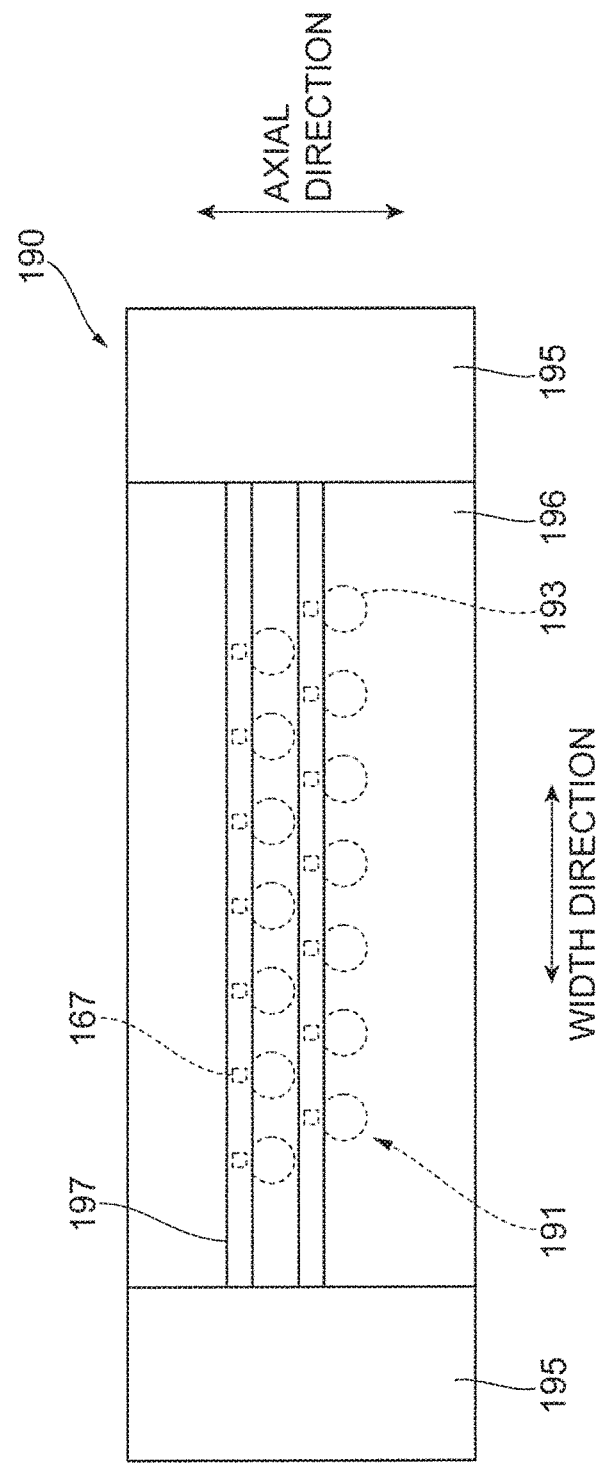

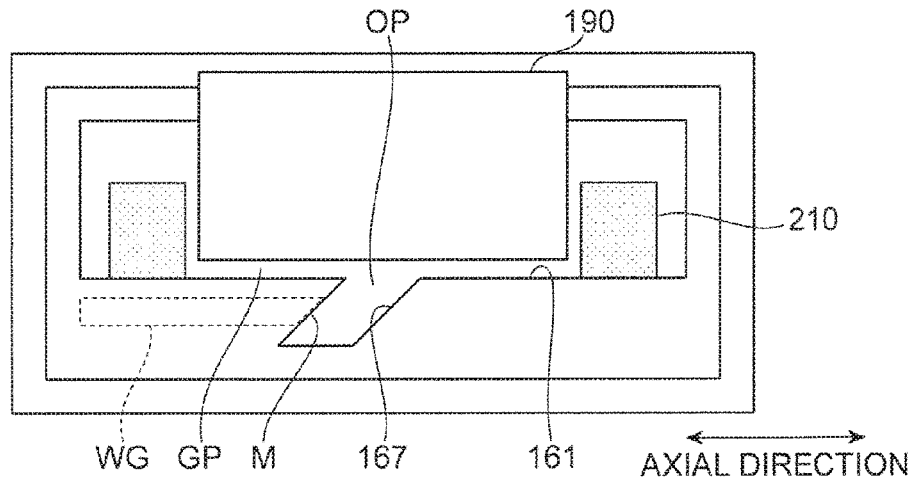
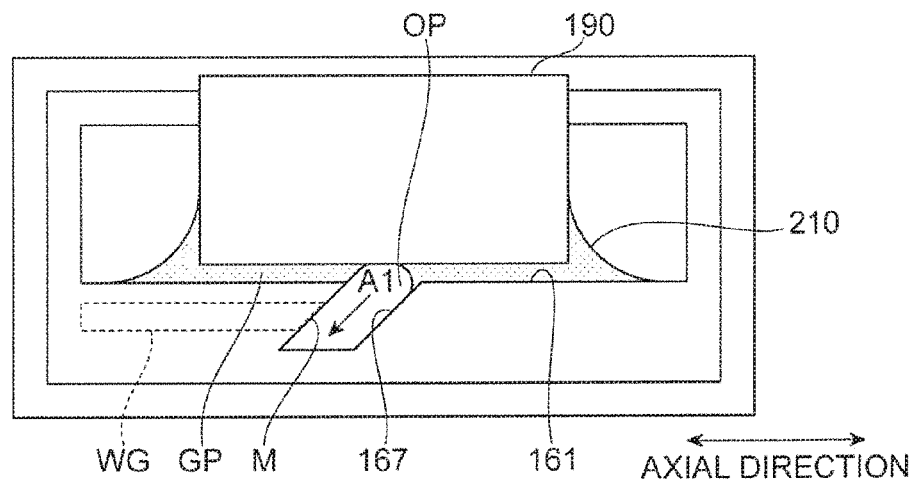
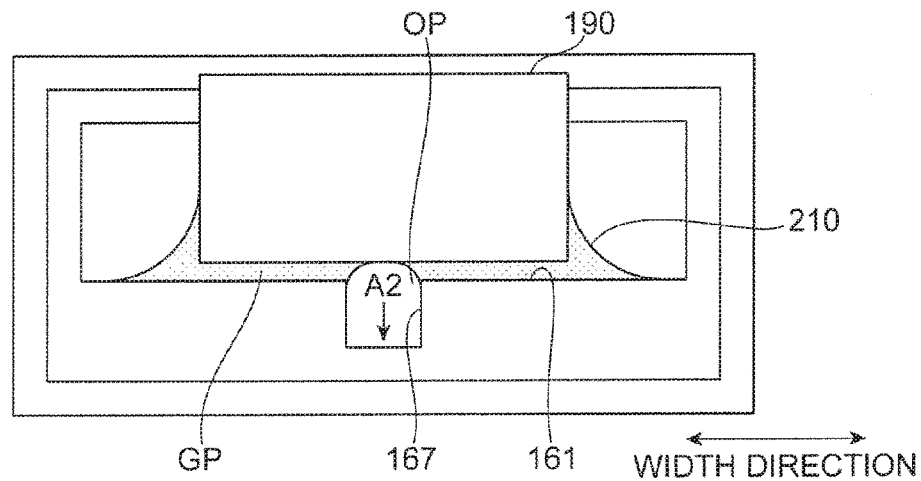

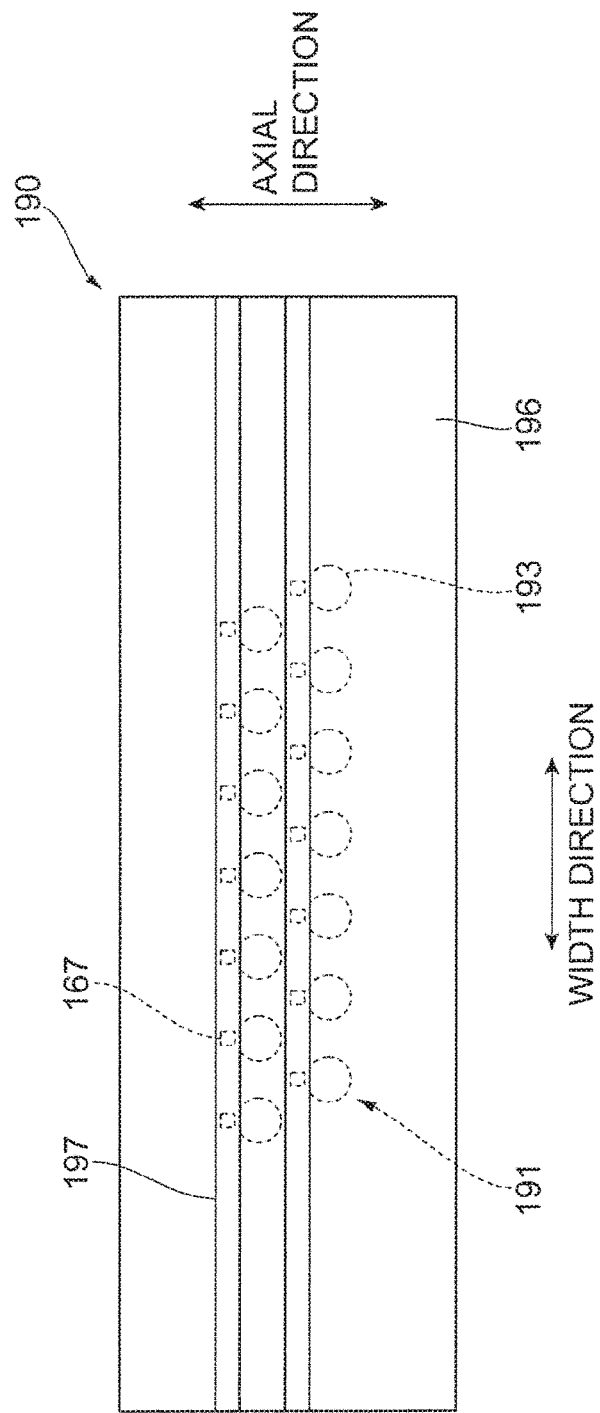

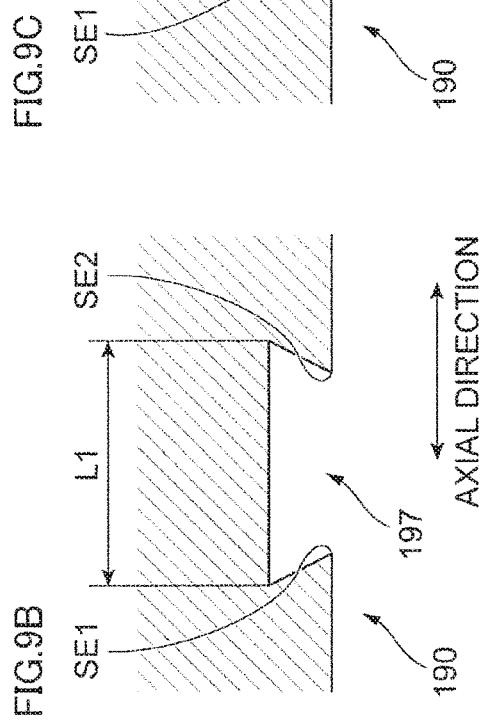
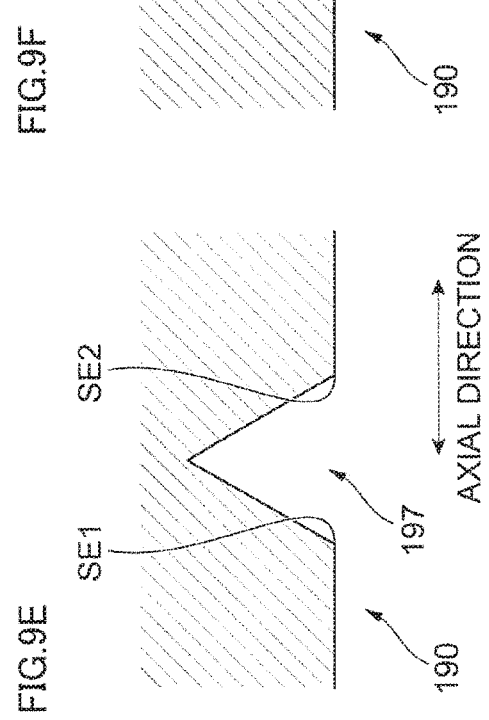
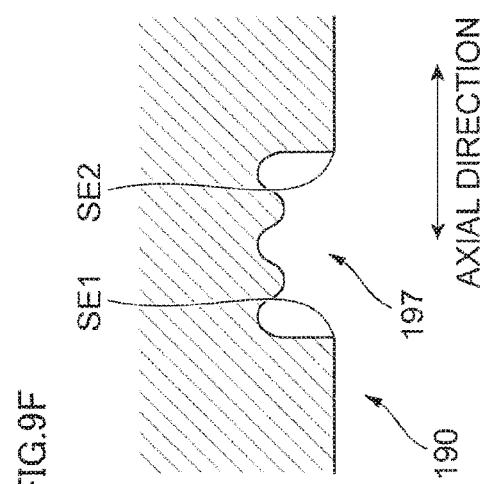
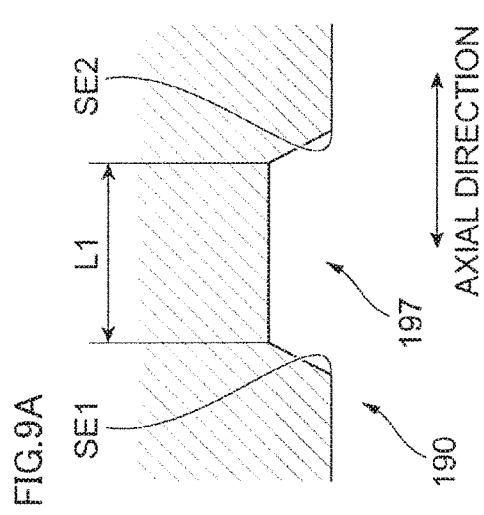
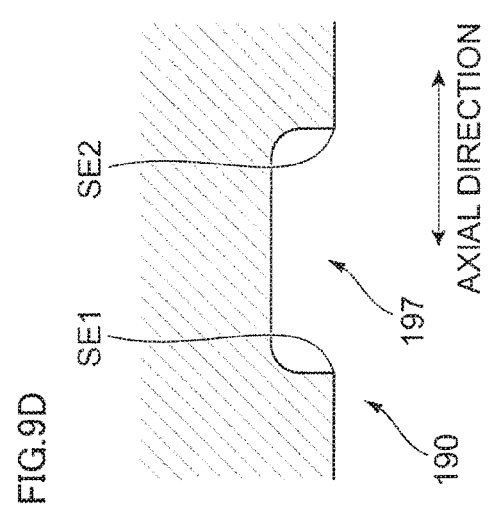

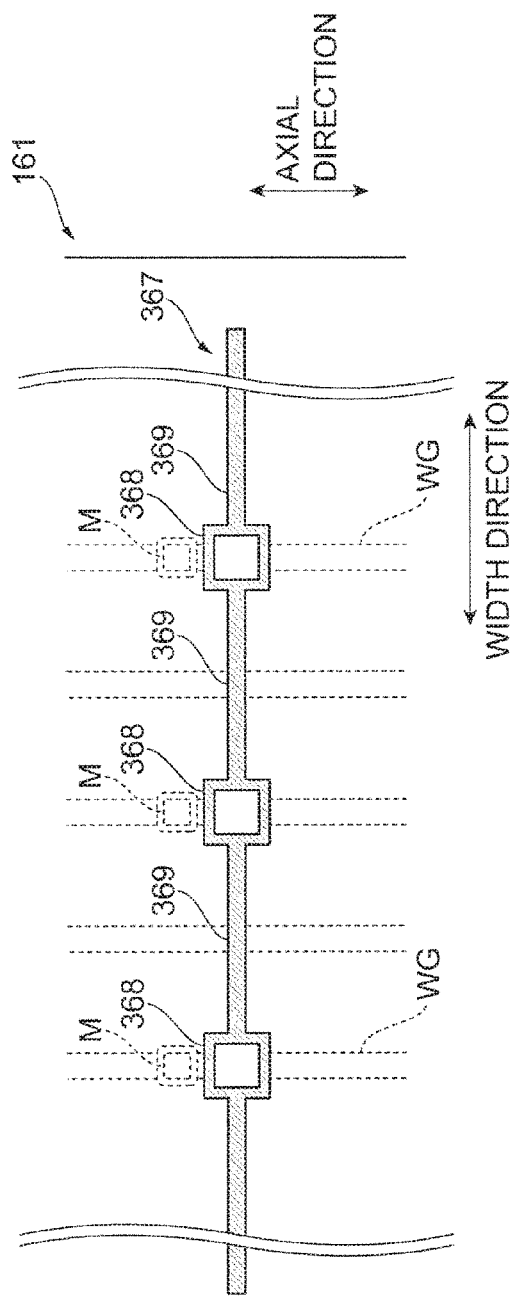
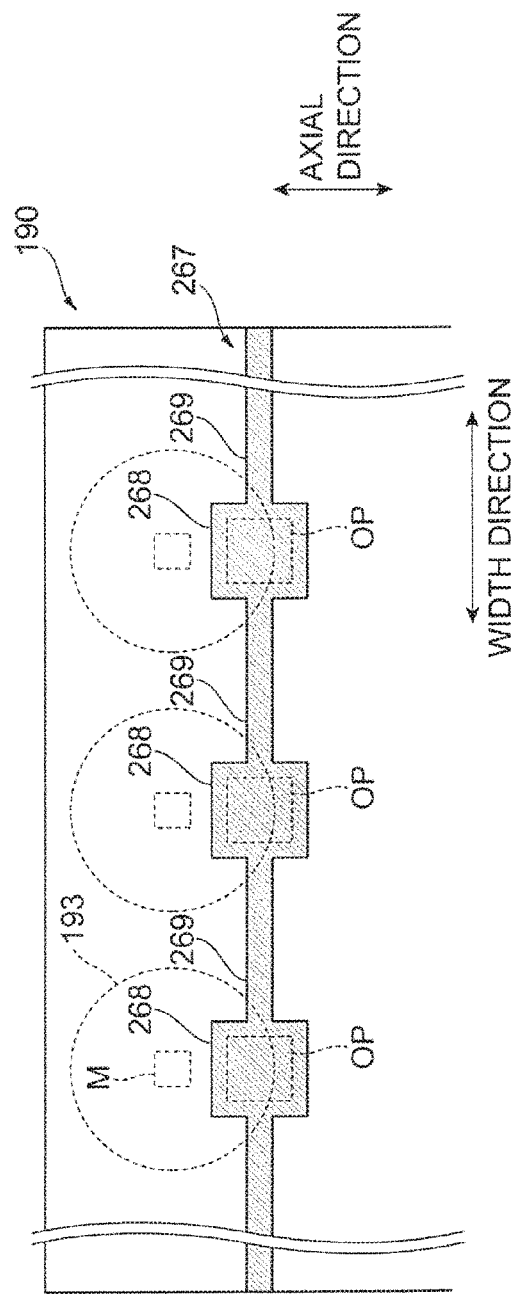
FIG.11A
FIG.11B

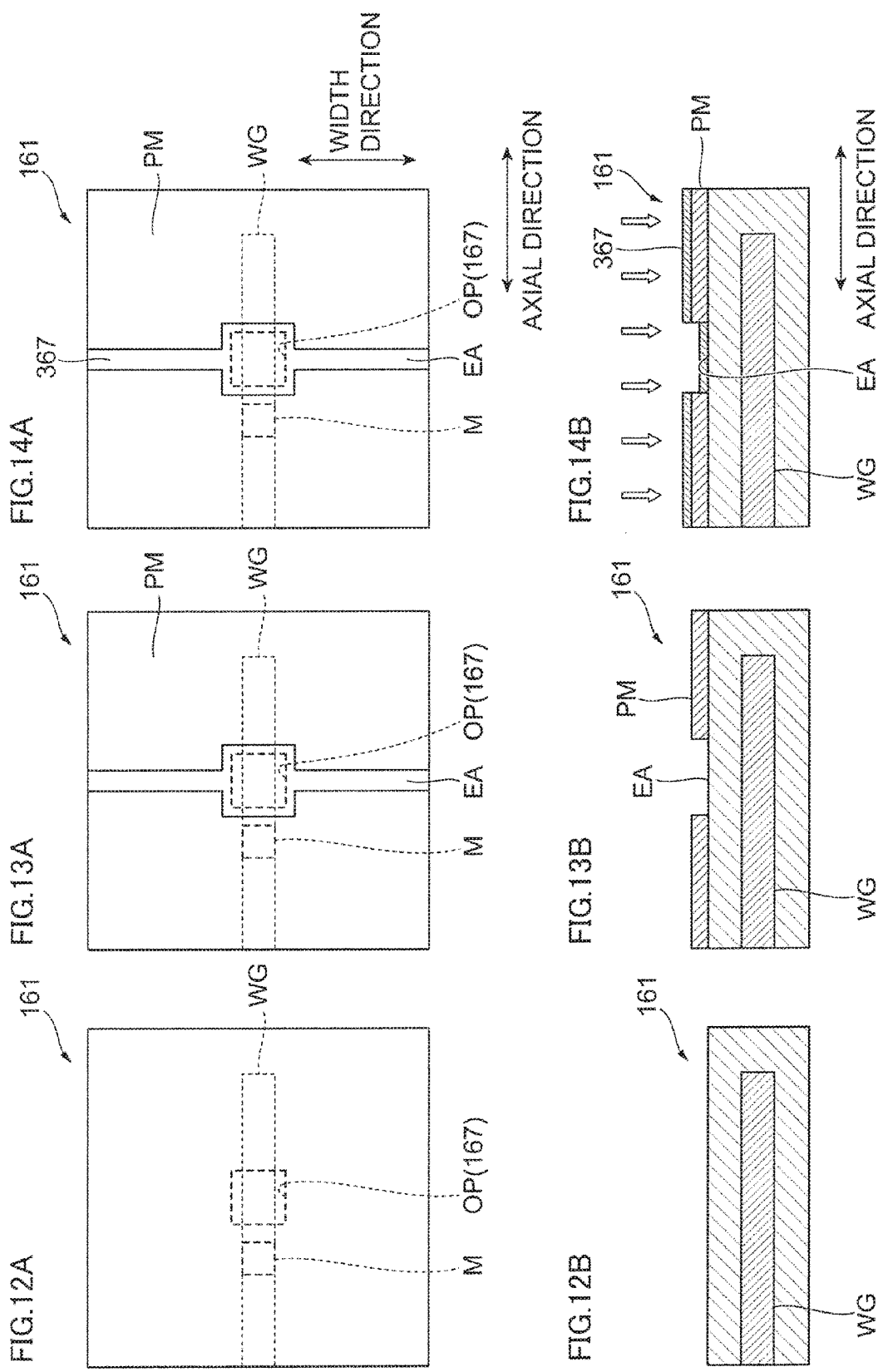

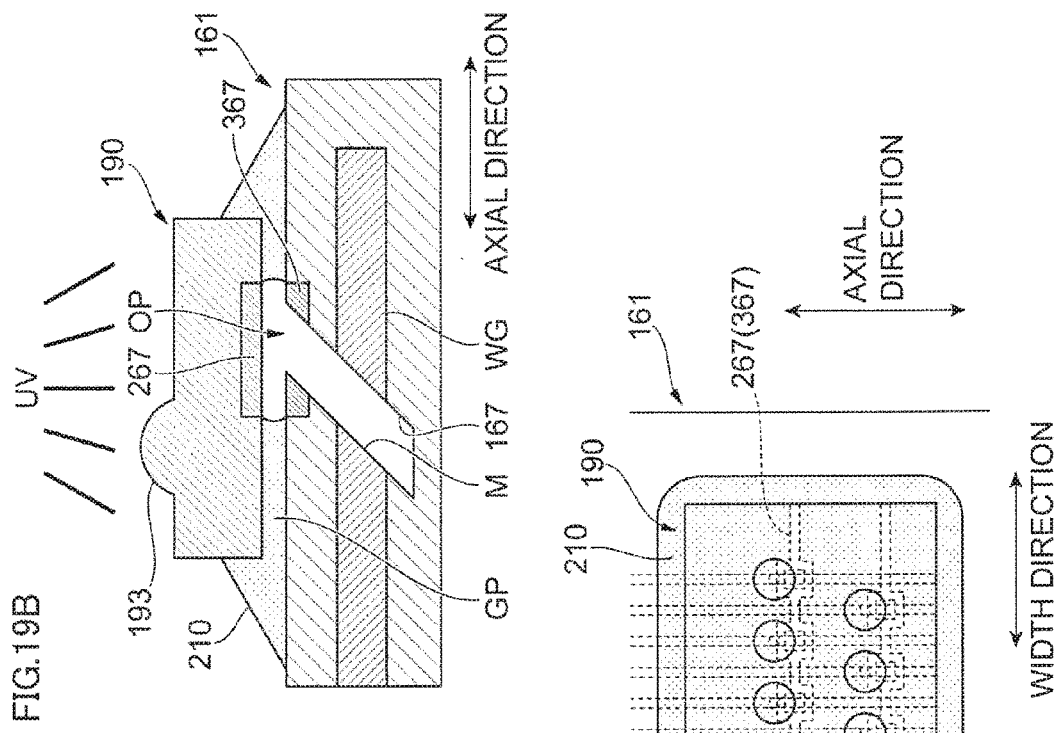
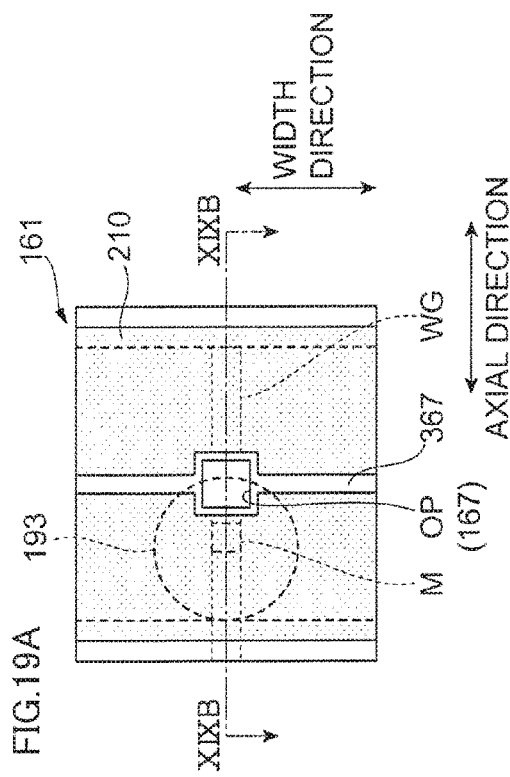
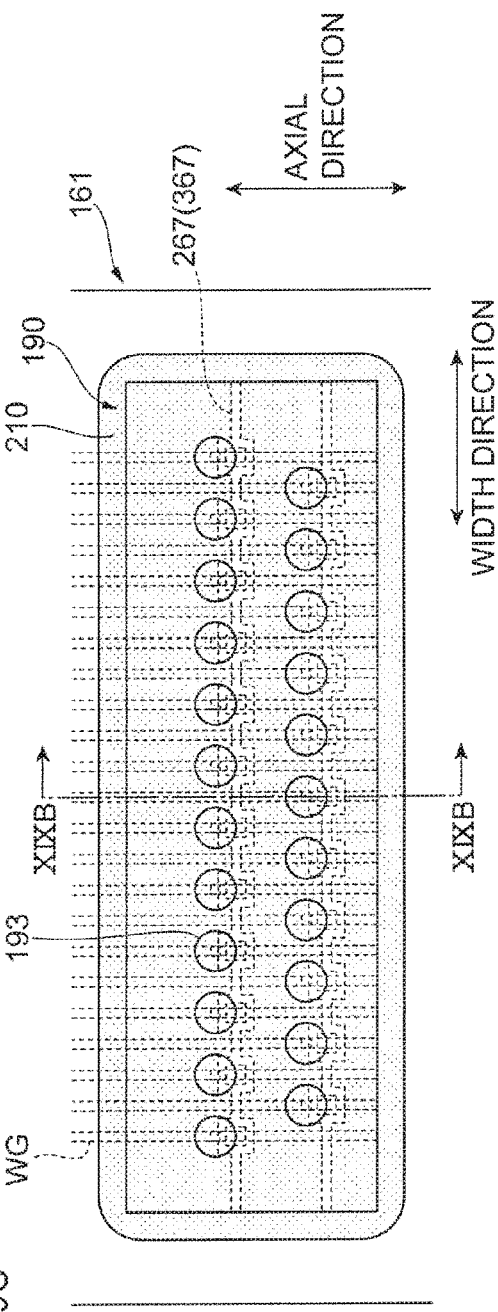

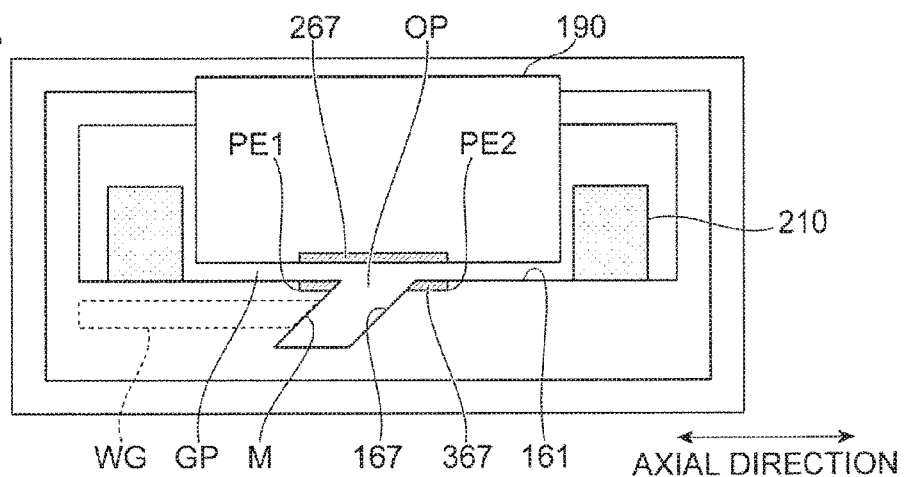
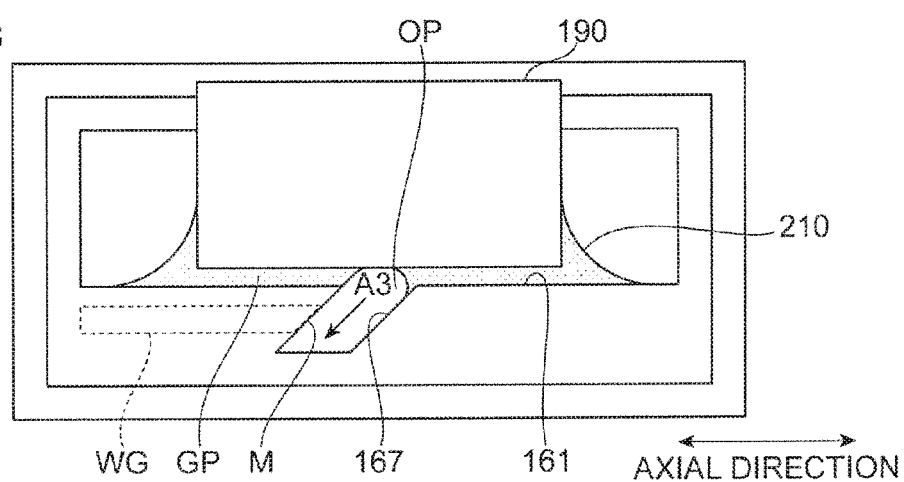
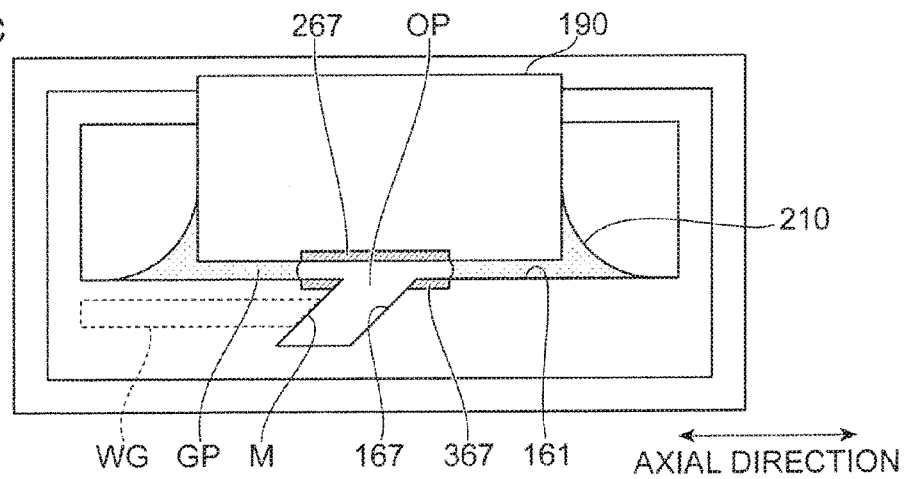

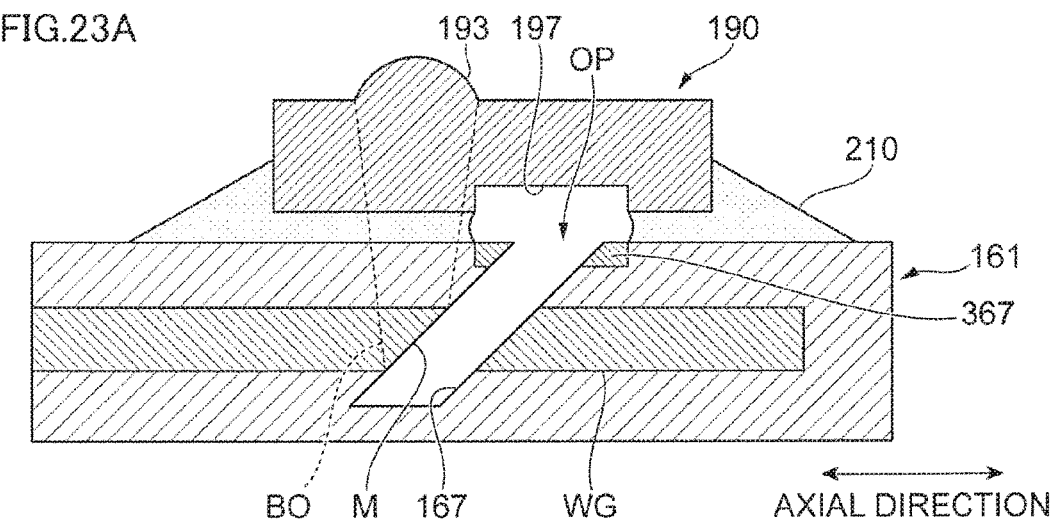
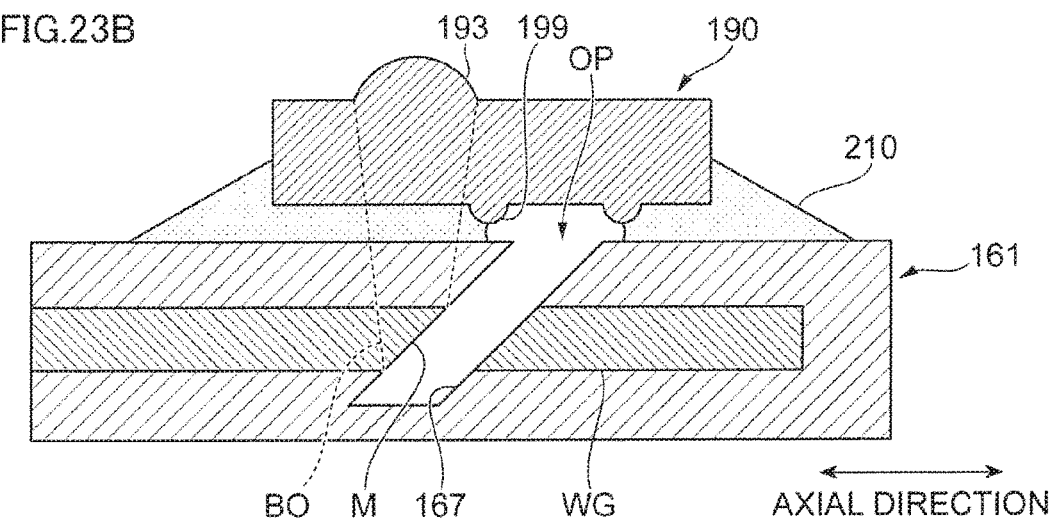

FLUID CONTROL STRUCTURE

BACKGROUND

Technical Field

The present invention relates to a fluid control structure.

Description of the Related Art

Recently, various techniques have been known regarding a fluid control structure.

SUMMARY

According to an embodiment of the present invention, an optical structure is provided. The optical structure includes a substrate, an optical component and an adhesive. The substrate includes a cavity on a first surface of the substrate. The optical component is on the substrate. The adhesive infiltrates into a gap between the substrate and the optical component to fix the optical component to the substrate. Further, in the optical structure, the optical component includes a recess on a second surface of the optical component, the second surface is opposed to the substrate, and the recess covers an opening of the cavity of the substrate.

According to another embodiment of the present invention, a fluid control structure is provided. The fluid control structure includes a first component, a second component and a fluid. The first component includes a cavity on a first surface of the first component. The second component is on the first component. The fluid infiltrates into a gap between the first component and the second component. Further, in the fluid control structure, the second component includes a recess on a second surface of the second component, the second surface is opposed to the first component, and the recess covers an opening of the cavity of the first component.

According to another embodiment of the present invention, a method for fabricating an optical structure is provided. The method includes forming a substrate with a cavity on a first surface of the substrate, forming an optical component with a recess on a second surface of the optical component, and mounting the optical component on the substrate, the second surface of the optical component being opposed to the first surface of the substrate. The recess covers an opening of the cavity of the substrate. The method further includes applying an adhesive between the substrate and the optical component so that the adhesive infiltrates into a gap between the substrate and the optical component, preventing the adhesive from flowing into the cavity with the recess, and fixing the optical component to the substrate with the adhesive.

BRIEF DESCRIPTION OF THE DRAWINGS

FIG. 3A is a schematic cross-sectional view taken along the line IIIA-IIIA in FIG. 2, in accordance with an embodiment of the present invention;

FIG. 3B is a top view of a substrate side component according to an embodiment of the present invention;

FIG. 5A is a bottom view of the substrate side component according to an embodiment of the present invention;

FIG. 7A depicts a configuration for simulation of fluid dynamics of the adhesive, in accordance with an embodiment of the present invention;

FIG. 7B depicts a simulation result of the flow of the adhesive in a direction parallel to the waveguide cores without the grooves according to a comparative example;

FIG. 7C depicts a simulation result of the flow of the adhesive in a direction perpendicular to the waveguide cores without the grooves according to a comparative example;

FIGS. 8A and 8B depict a bottom view of the substrate side component according to modifications of an embodiment of the present invention;

FIGS. 9A, 9B, 9C, 9D, 9E and 9F depict a cross-sectional view of the groove according to modifications of an embodiment of the present invention;

FIG. 11A is a top view of a waveguide layer according to an embodiment of the present invention;

FIG. 11B is a bottom view of the substrate side component according to an embodiment of the present invention;

FIGS. 12A and 12B depict a top view and a side view, respectively, of the waveguide layer during the fabrication process according to an embodiment of the present invention;

FIGS. 13A and 13B depict a top view and a side view, respectively, of the waveguide layer during the fabrication process of the present invention;

FIGS. 14A and 14B depict a top view and a side view, respectively, of the waveguide layer during the fabrication process of the present invention;

FIGS. 19A, 19B and 19C depict a top view, a side view, and a wide range top view, respectively, of the waveguide layer during of the fabrication process of the present invention;

FIG. 20A depicts a configuration for simulation of fluid dynamics of the adhesive, in accordance with an embodiment of the present invention;

FIG. 20B depicts a simulation result of the flow of the adhesive in a direction parallel to the waveguide cores without the hydrophobic areas according to a comparative example of the present invention;

FIG. 20C depicts a simulation result of the flow of the adhesive in a direction parallel to the waveguide cores with the hydrophobic areas according to an embodiment of the present invention;

FIGS. 23A and 23B depict a side view of the mirror cavities according to modifications of an embodiment of the present invention;

DETAILED DESCRIPTION

Hereinafter, exemplary embodiments of the present invention will be described in detail with reference to the attached drawings.

It should be noted that the present invention is not limited to these exemplary embodiments to be given below and may be implemented with various modifications within the scope of the present invention. In addition, the drawings used herein are for purposes of illustration, and may not show actual dimensions.

Figure 1:
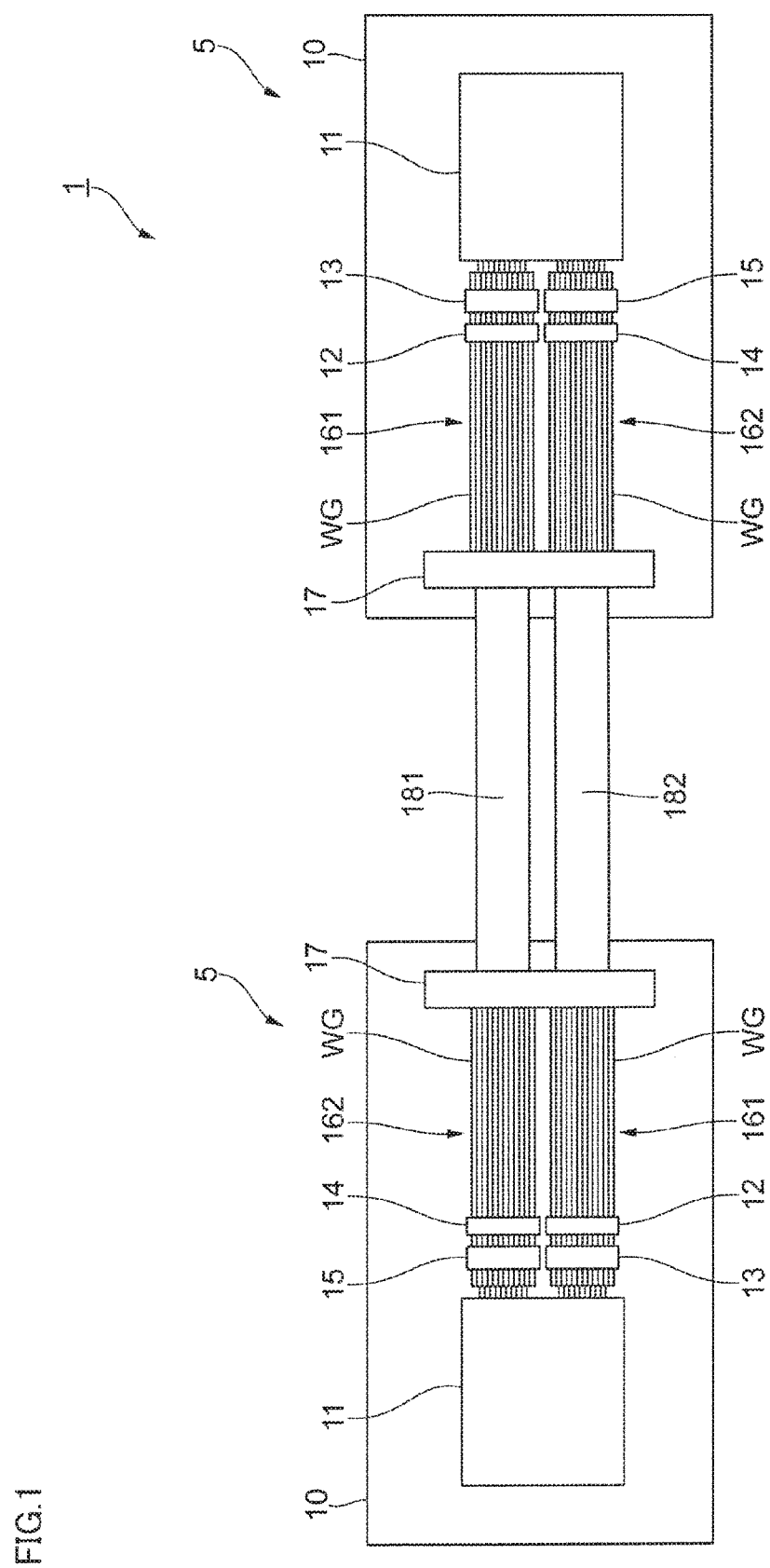
FIG. 1 is a top view of an optical communication system according to an embodiment of the present invention.

Referring to FIG. 1, a top view of an optical communication system 1 according to an embodiment is illustrated. As shown in the figure, the optical communication system 1 may include two multi-chip modules (MCMs) 5. A multi-chip module (MCM) 5 may include a main substrate 10, a central processing unit (CPU) 11, a vertical cavity surface emitting laser (VCSEL) chip array 12, a laser diode driver (LDD) chip 13, a photodiode (PD) chip array 14, a transimpedance amplifiers (TIA) chip 15, waveguide layers 161 and 162, and a fiber connector 17. Further, as shown in the figure, the optical communication system 1 may include fiber cables 181 and 182 each having several (e.g., 12 or 24) fiber cable cores.

The waveguide layer 161 may include multiple waveguide cores WG whose number matches the number of cores of the fiber cable 181 or 182. The VCSEL chip array 12 may include multiple VCSEL devices whose number matches the number of fiber cores (not shown) of the waveguide layer 161. The waveguide layer 162 may include multiple waveguide cores WG whose number matches the number of fiber cores (not shown) of the fiber cable 181 or 182. The PD chip array 14 may include multiple PD devices whose number matches the number of cores of the waveguide layer 162. The MCM 5 is an example of an optical multi-chip module.

Figure 2:
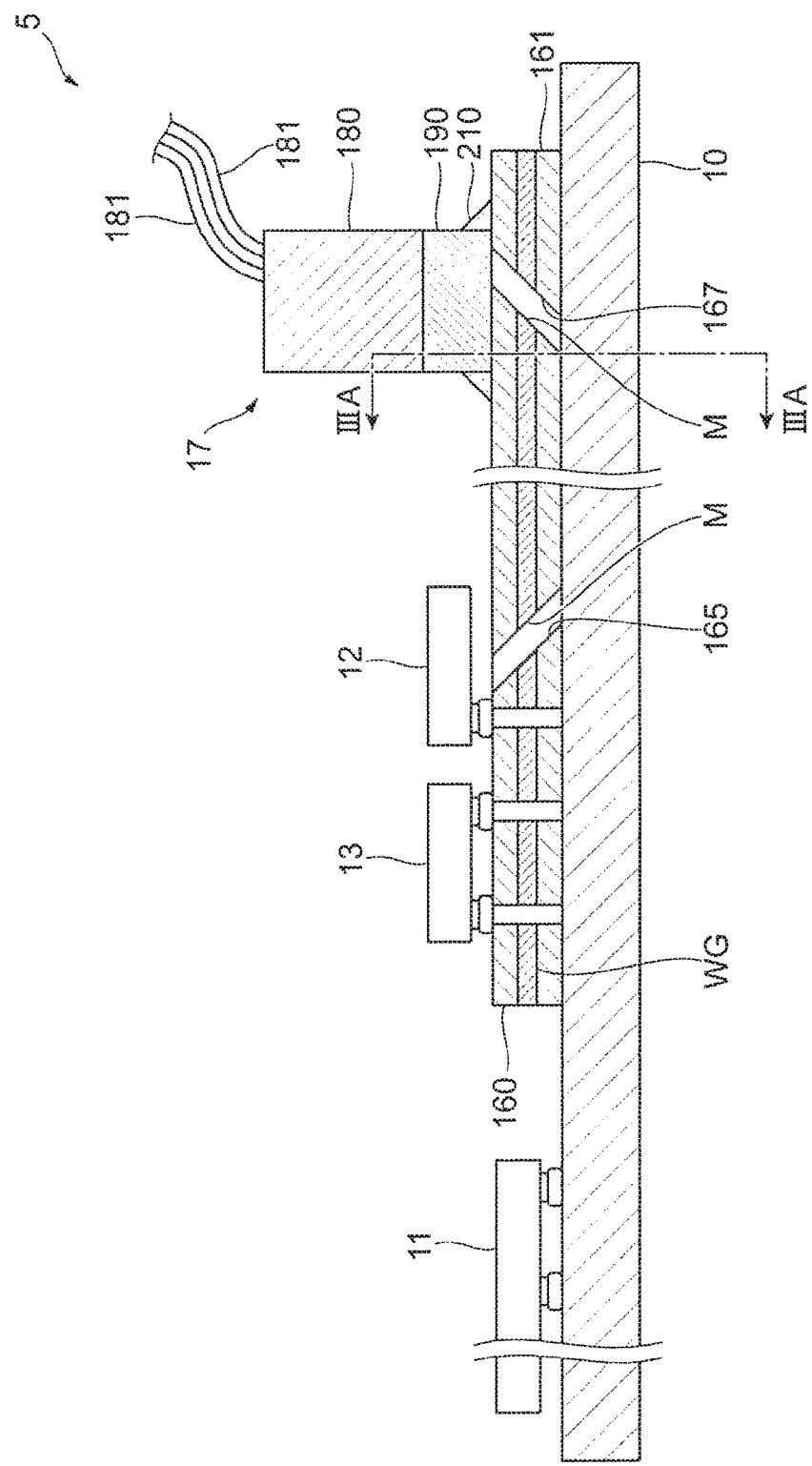
FIG. 2 is a side view of a multi-chip module (MCM) according to an embodiment of the present invention.

Referring to FIG. 2, a side view of the MCM 5 is shown according to an embodiment. As shown in the figure, the waveguide layer 161 may be formed on the surface of the main substrate 10. The waveguide layer 161 may include the waveguide cores WG and a cladding layer 160. The waveguide layer 161 may be formed as a polymer waveguide.

The waveguide layer 161 may be provided with multiple mirror cavities 165. The mirror cavities 165 are provided at one end of the waveguide core WG (left side in FIG. 2) and opposed to the VCSEL chip array 12. Each mirror cavity 165 is provided on each waveguide core WG. In other words, the number of the mirror cavities 165 matches the number of the waveguide cores WG.

The waveguide layer 161 may also be provided with multiple mirror cavities (mirror ablation holes) 167. The mirror cavities 167 are provided at the other end of the waveguide core WG (right side in FIG. 2) and opposed to the fiber connector 17. Each mirror cavity 167 is provided on each waveguide core WG. In other words, the number of the mirror cavities 167 matches the number of the waveguide cores WG. The mirror cavity 167 is an example of a cavity.

The mirror cavities 165 and 167 may be inclined at an angle of 45° to form reflective surfaces (mirrors M), on boundaries (interfaces) between the waveguide cores WG and the mirror cavities 165 or the mirror cavities 167. In an embodiment, the boundaries may be provided without a metal coating, and the mirror cavities 165 and 167 may be filled with air (e.g., atmosphere). This configuration enables the mirrors M to reflect the light by total internal reflection (TIR). More specifically, the mirrors M of the mirror cavities 165 reflect the light from the VCSEL chip array 12 to the waveguide cores WG by total internal reflection. The mirrors M of the mirror cavities 167 reflect the light from the waveguide cores WG to the fiber connector 17 by total internal reflection.

Note that in the embodiment at least shown in FIG. 2, the mirrors M of the mirror cavities 167 are provided in staggered positions in the waveguide cores WG to form two rows (refer to FIG. 3B.)

The fiber connector 17 may include a fiber side component 180 and a substrate side component 190. The fiber side component 180 connected to the fiber cables 181 and 182 may be mounted on the substrate side component 190. The substrate side component 190 may be directly mounted on the waveguide layer 161 to receive the fiber side component 180.

The substrate side component 190 is glued onto the waveguide layer 161 using an underfilling material, e.g., an adhesive 210. The adhesive 210 may be a photocurable material, such as ultraviolet (UV) curing resin or a thermal curing material.

Next, an explanation is given about the general method for fixing the fiber connector 17 to the waveguide layer 161 in accordance with an embodiment with reference to FIG. 2. Note that the mirror cavities 165 and 167 are assumed to have been provided on the surface of the waveguide layer 161 with conventional techniques, such as laser processing or dicing.

The substrate side component 190 of the fiber connector 17 is first mounted on the waveguide layer 161. The adhesive 210 in a fluidized state is applied around the substrate side component 190. The adhesive 210 distributes through a gap GP (refer to FIG. 3A) between the bottom surface of the substrate side component 190 and the top surface of the waveguide layer 161 due to capillary effect.

Curing light is then directed towards the gap GP from above to cure the adhesive 210. This enables to fix the substrate side component 190 to the waveguide layer 161. The fiber side component 180 to which the fiber cables 181 and 182 has been connected is mounted on the substrate side component 190.

Figure 3C:
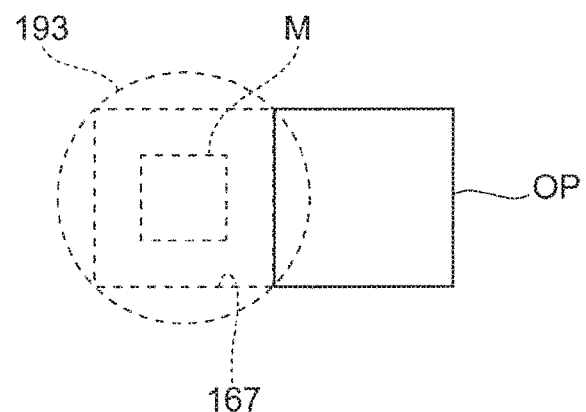
FIG. 3C is a top view of an opening according to an embodiment of the present invention.
Figure 3D:
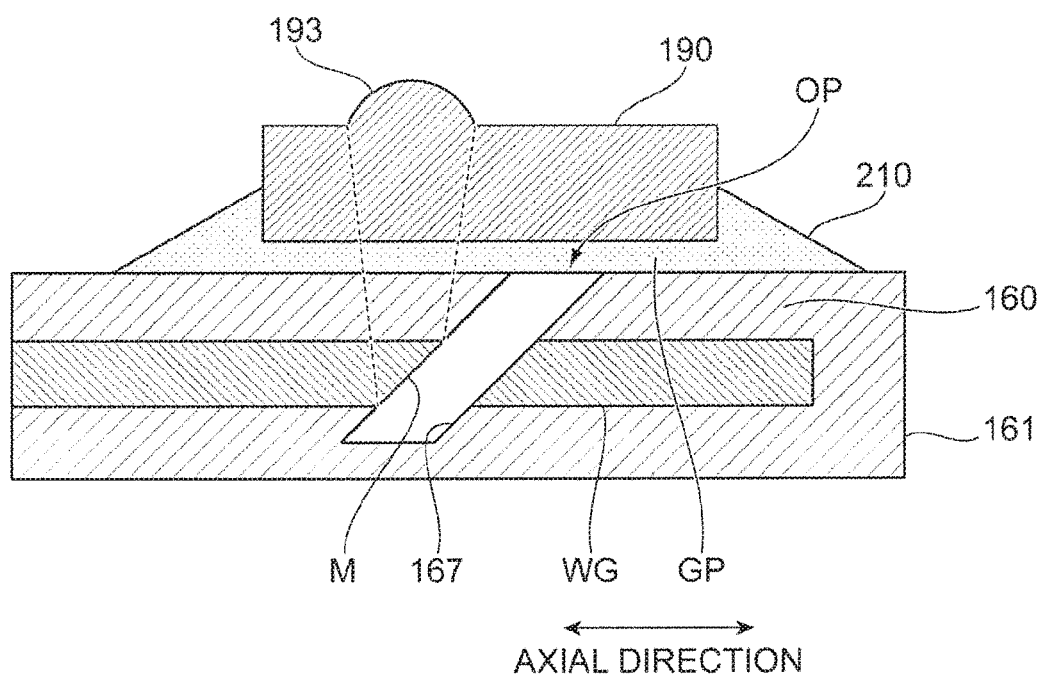
FIG. 3D is a schematic cross-sectional view taken along the line IIID-IIID in FIG. 3B of the present invention.

FIG. 3A depicts a schematic cross-sectional view taken along the line IIIA-IIIA in FIG. 2. FIG. 3B depicts a top view of the substrate side component 190 according to an embodiment of the present invention. FIG. 3C depicts a top view of the opening OP according to an embodiment of the present invention. FIG. 3D depicts a schematic cross-sectional view taken along the line IIID-IIID in FIG. 3B.

As shown in FIGS. 3A and 3B, the substrate side component 190 may have a generally rectangular parallelepiped shape. The substrate side component 190 may include a substrate side microlens array 191, first support portions 194, and second support portions 195. In an embodiment, the substrate side component 190 may be configured as a single piece.

The microlens array 191 may be positioned on the top surface of the substrate side component 190. The microlens array 191 may include multiple microlenses 193. The microlens array 191 is arranged in two rows corresponding to the rows of the mirrors M of the mirror cavities 167. The microlens 193 is an example of a lens.

The substrate side component 190 may be positioned on the waveguide layer 161 so that each microlens 193 is aligned with the corresponding mirror M provided on each waveguide core WG (refer to FIG. 3C). Note that the fiber side component 180 may also include a fiber side microlens array (not shown). Each microlens 193 of the substrate side component 190 is aligned with each fiber side microlens. This configuration allows the light reflected at the mirror M to pass the microlens 193 of the substrate side component 190 and the corresponding microlens of the fiber side component 180.

The first support portions 194 are protruded portions on the top surface of the substrate side component 190. The first support portions 194 may be provided on both sides in the longitudinal direction of the substrate side component 190. The first support portions 194 support the fiber side component 180. In an embodiment, the microlens array 191 is provided between the first support portions 194.

The second support portions 195 are protruded portions on the bottom surface of the substrate side component 190. The second support portions 195 may be provided on both sides in the longitudinal direction of the substrate side component 190. The second support portions 195 may be mounted on the waveguide layer 161. Note that an area between the second support portions 195 is hereinafter called a central area 196. The height of the second support portions 195 is set to form the gap GP through which the adhesive 210 distributes due to capillary effect.

The bottom surface of the substrate side component 190, more specifically the central area 196, is opposed to the area of the upper surface of the waveguide layer 161 in which the mirror cavities 167 are provided. In other words, the substrate side component 190 may cover the mirror cavities 167.

As described above, the substrate side component 190 may be fixed using the adhesive 210. As shown in FIG. 3D, the gap GP between the bottom surface of the substrate side component 190 and the top surface of the waveguide layer 161 may be filled with the adhesive 210. The adhesive 210 in the gap GP may be required to provide sufficient mechanical stability (e.g., mechanical support) between the substrate side component 190 and the waveguide layer 161.

The substrate side component 190 is an example of an optical component or an example of a second component. The bottom surface of the substrate side component 190 is an example of a second surface of the optical component. The waveguide layer 161 is an example of a substrate or an example of a first component. The top surface of the waveguide layer 161 is an example of a first surface of the substrate. The adhesive 210 is an example of a fluid.

The adhesive 210 also acts as an index-matching substance to reduce reflection loss at the gap GP. More specifically, the light coming from the mirror M to the microlens 193 passes the gap GP. Filling the gap GP with the adhesive 210 enables to reduce difference in refractive index between the adhesive 210 in the gap GP and the substrate side component 190 or the waveguide layer 161, compared with the gap GP filled with air. Filling the gap GP with the adhesive 210 also enables to eliminate an air boundary in the gap GP.

As previously mentioned, the adhesive 210 in a fluidized state distributes through the gap GP due to capillary effect. Controlling a flow of the adhesive 210 may influence a yield in the manufacturing process, e.g., the lens assembling process, of the optical communication system 1 (refer to FIG. 1).

Figure 4A:
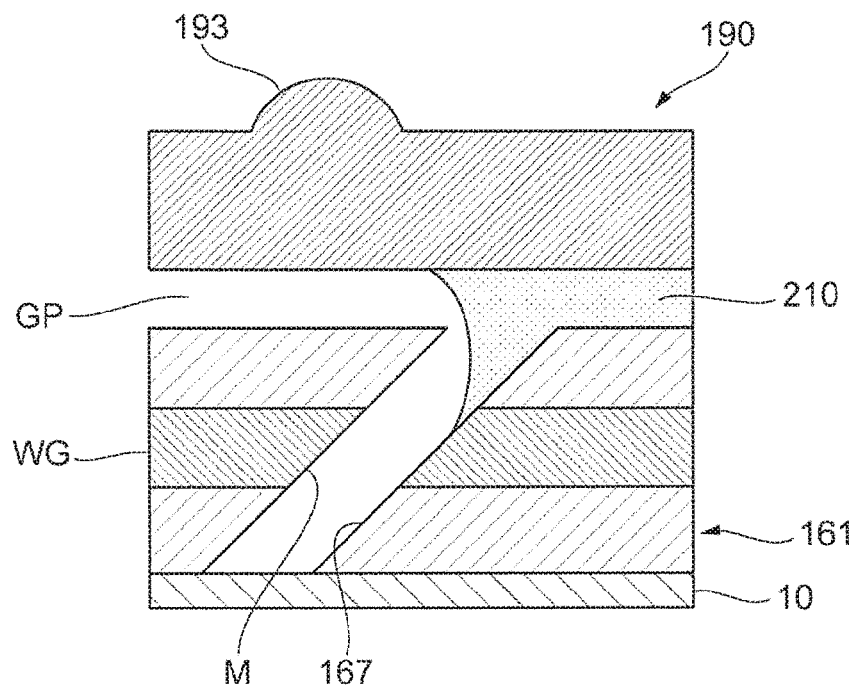
FIGS. 4A and 4B depict a flow of adhesive around mirror cavities in a comparative example.
Figure 4B:
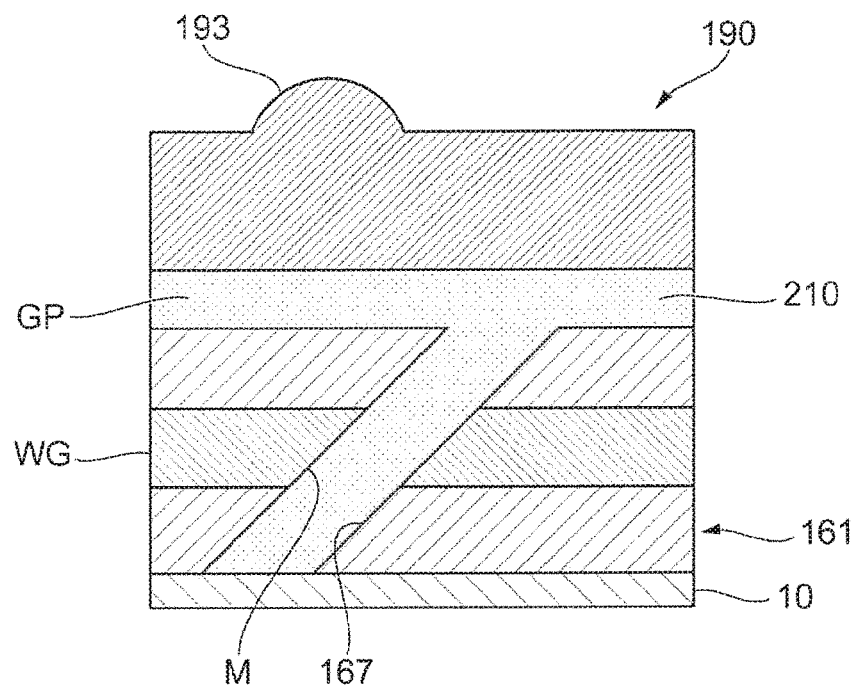

Referring to FIGS. 4A and 4B, a flow of the adhesive 210 around the mirror cavities 167 in a comparative example is illustrated. As shown in FIG. 4A, the fluidized adhesive 210 may distribute through the gap GP. The distributing adhesive 210 may flow into the mirror cavities 167, as shown in FIG. 4B. Such flow of the adhesive 210 into the mirror cavities 167 may decline the reflectivity at the mirror M. In other cases, the adhesive 210 may not completely fill the gap GP. Such insufficient filling of the adhesive 210 may decline the transmittance of the gap GP.

To prevent a low yield, a sidefill process may be applicable to apply the adhesive 210, instead of this comparative example. However, this configuration may reduce the mechanical strength between the substrate side component 190 and the waveguide layer 161, or may introduce reflection loss at the gap GP (at air interfaces.)

Figure 5B:
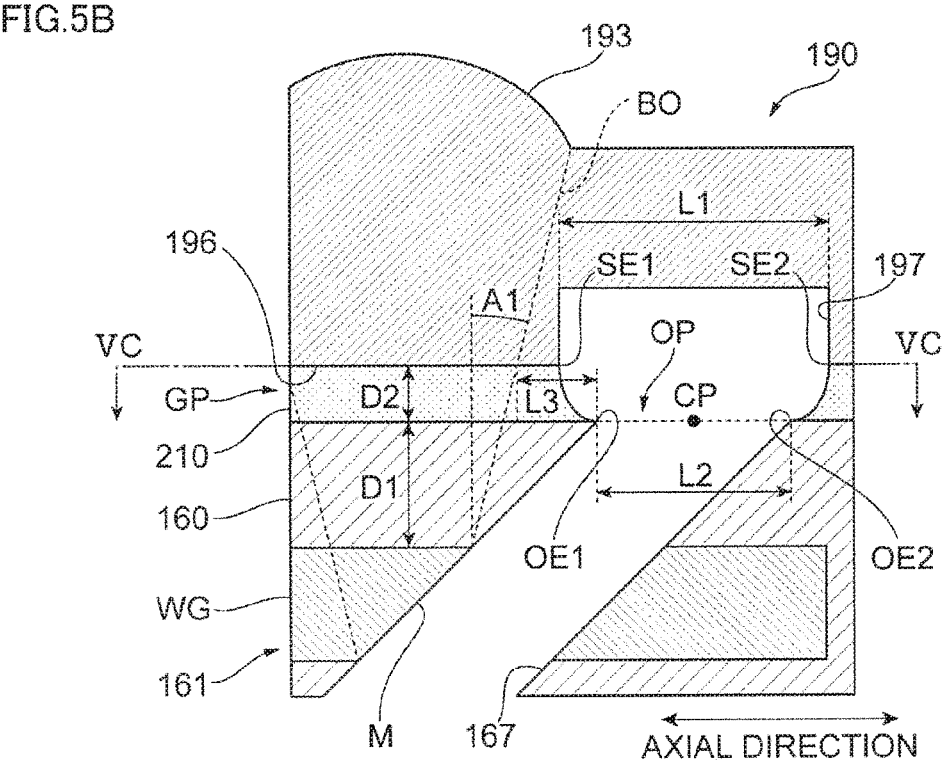
FIG. 5B is a side view of an area around the mirror cavities according to an embodiment of the present invention.
Figure 5C:
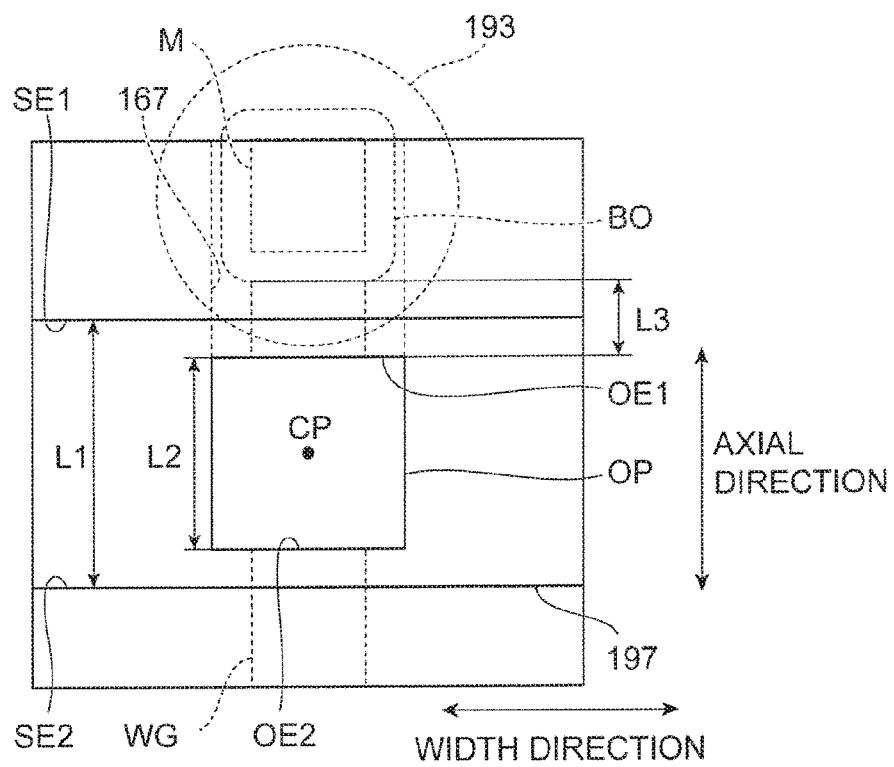
FIG. 5C is a cross-sectional view taken along the line VC-VC in FIG. 5B of the present invention.

FIG. 5A depicts a bottom view of the substrate side component 190 according to an embodiment of the present invention. FIG. 5B depicts a side view of an area around the mirror cavities 167 according to an embodiment. FIG. 5C depicts a cross-sectional view taken along the line VC-VC in FIG. 5B.

As shown in FIG. 5A, the substrate side component 190 may include grooves 197. The grooves 197 may be provided on the bottom surface of the substrate side component 190 in the central area 196. The grooves 197 are arranged in two rows corresponding to the rows of the microlens array 191, in other words, corresponding to the rows of the mirror cavities 167. The groove 197 is an example of a recess.

Note that the groove 197 is an example of a recess on the bottom surface of the substrate side component 190. The groove 197 enlarges the height (size) of the gap GP. In other words, the gap size increases abruptly in the groove 197. In an embodiment, the cross-sectional shape of the groove 197 is rectangular (refer to FIG. 5B).

As shown in FIG. 5B, each of the grooves 197 may be opposed to an opening OP of the mirror cavities 167. Also, as shown in FIG. 5C, each of the grooves 197 may cover the opening OP of the mirror cavities 167 in a top view.

Next, an explanation is provided with respect to the dimension of the groove 197 in an embodiment with reference to FIGS. 5B and 5C.

In the following explanation, the direction along the axis of the waveguide core WG is hereinafter called an axial direction. The direction perpendicular to the axis of the waveguide core WG is hereinafter called a width direction. The edges of the groove 197 in the axial direction are hereinafter called a first groove edge SE1 (left side in FIG. 5B) and a second groove edge SE2 (right side in FIG. 5B), respectively. The edges of each mirror cavity 167 in the axial direction are hereinafter called a first cavity edge OE1 (left side in FIG. 5B) and a second cavity edge OE2 (right side in FIG. 5B). The center of the opening OP is hereinafter called a center CP. Note that each mirror cavity 167 and the top surface of the microlens array 191 make an acute angle at the first cavity edge OE1, and make an obtuse angle at the second cavity edge OE2.

In an embodiment, the length L1 of the groove 197 in the axial direction may be longer than the length L2 of the opening OP in the axial direction. The length L2 may be 10 um to 100 um (micrometer), preferably 25 um to 75 um, and more preferably 45 um to 55 um. The length L1 may be 10 um to 100 um, preferably 30 um to 80 um, and more preferably 60 um to 70 um. In an embodiment, each of the grooves 197 may cover the opening OP to some extent (e.g., 10%), or fully cover the opening OP (e.g., more than 110%).

In the axial direction, the first groove edge SE1 may be on the farther side from the center CP than the first cavity edge OE1. The second groove edge SE2 may be on the farther side from the center CP than the second cavity edge OE2.

Here, as shown in FIG. 5B, the light reflected at the mirror M is directed towards the microlens 193 while expanding the beam outline BO. In the embodiment, to prevent the light from passing the grooves 197, the first groove edge SE1 is on the outside of the beam outline BO. In other words, the grooves 197 are provided on a position separated from the beam outline BO. The beam outline BO is an example of a light path.

With the following dimensions, there is an approximately 10 um (micro meter) margin to offset the first groove edge SE1 towards the beam outline BO from the first cavity edge OE1. In other words, the length L3 between the first cavity edge OE1 and the beam outline BO on a plane including the bottom surface of the central area 196 is approximately 10 um. The detailed dimensions are as follows: the diameter of the waveguide core WG is 25 um; the diameter of the microlens 193 is 250 um; the spread angle A1 of the light reflected at the mirror M is 12 degrees; the thickness D1 of the cladding layer 160 above the waveguide cores WG is 15 um; and the thickness D2 of the adhesive 210 is 10 um.

Here, the substrate side component 190 may be integrally formed by injection molding. In this case, the grooves 197 may be provided on the substrate side component 190 in the injection mold process. In other words, the grooves 197 may be readily imprinted by injection molding. This reduces an additional cost for fabrication of the grooves 197. However, the methods for forming the substrate side component 190 and the grooves 197 are not limited to this. For example, the substrate side component 190 with the grooves 197 may be formed by a 3D printer. Alternatively, the grooves 197 may be formed on the substrate side component 190 after forming the substrate side component 190. For example, the grooves 197 may be formed by laser processing or dicing.

In an embodiment, an improved control of capillary flow of the adhesive 210 may lead to a higher yield in the assembling process (lens assembling process) of the optical communication system 1. Note that the adhesive 210 in the gap GP, e.g., underfilling adhesive may provide better mechanical strength than sidefilling.

Figure 6:
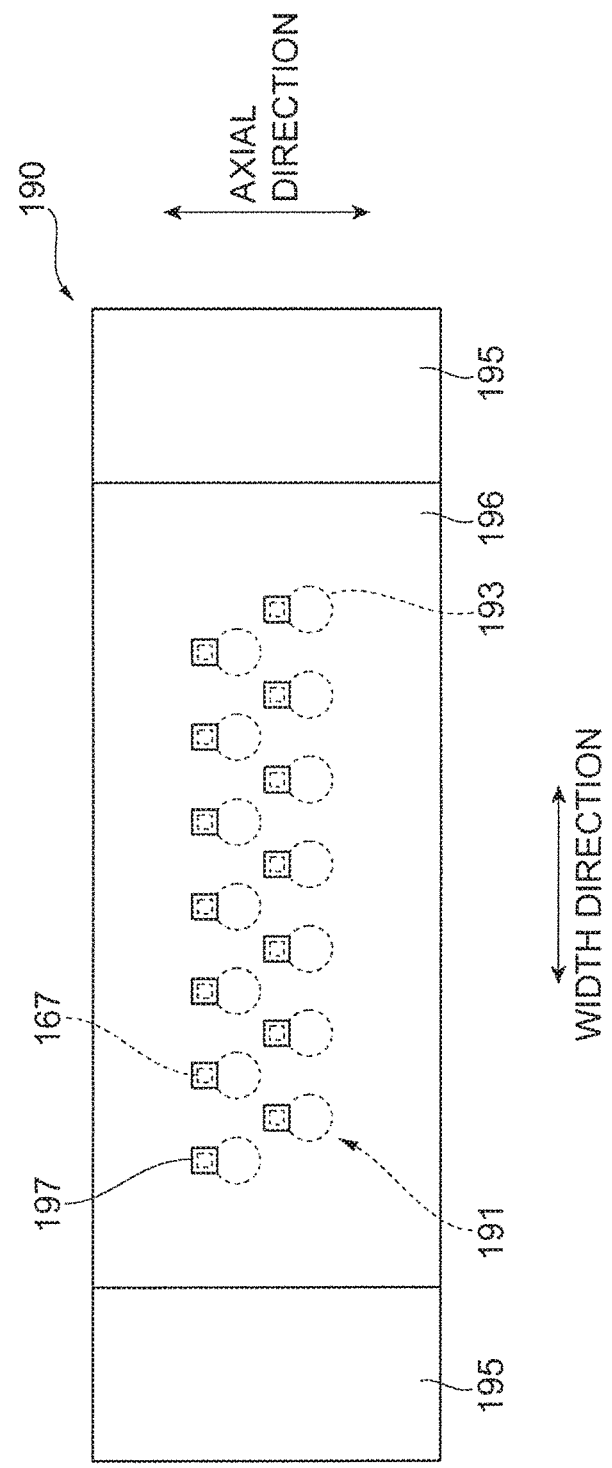
FIG. 6 is a bottom view of the substrate side component according to a modification of an embodiment of the present invention.

FIG. 6 depicts a bottom view of the substrate side component 190 according to a modification of an embodiment of the present invention. As shown in FIG. 6, the substrate side component 190 may be provided with multiple dispersed grooves 197. Each groove 197 may have a generally square shape in a plane view. Each groove 197 may be provided on a position corresponding to each microlens 193. The grooves 197 may be opposed to the corresponding mirror cavities 167 to prevent (suppress) the entrance of the adhesive 210 into the mirror cavities 167. In other words, the grooves 197 may prevent the adhesive 210 from reaching the mirror M.

Figure 7D:
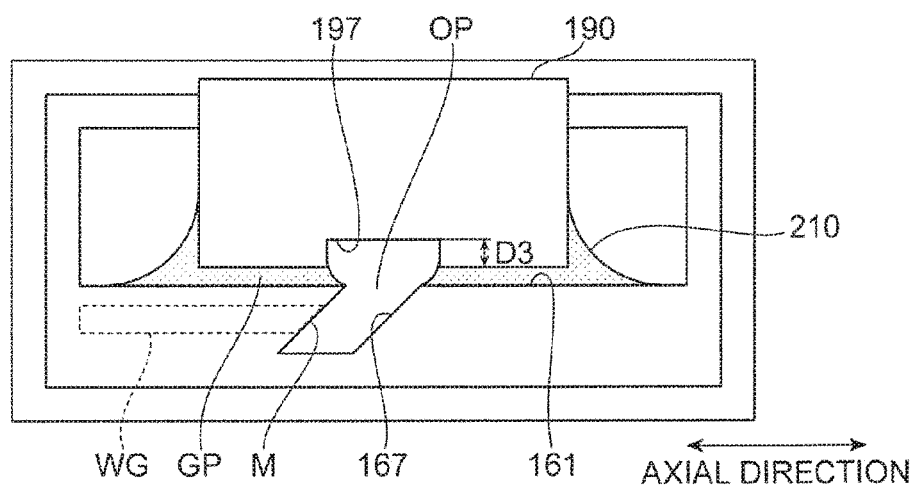
FIG. 7D depicts a simulation result of the flow of the adhesive in a direction parallel to the waveguide cores with the grooves according to a modification of an embodiment of the present invention.
Figure 7E:
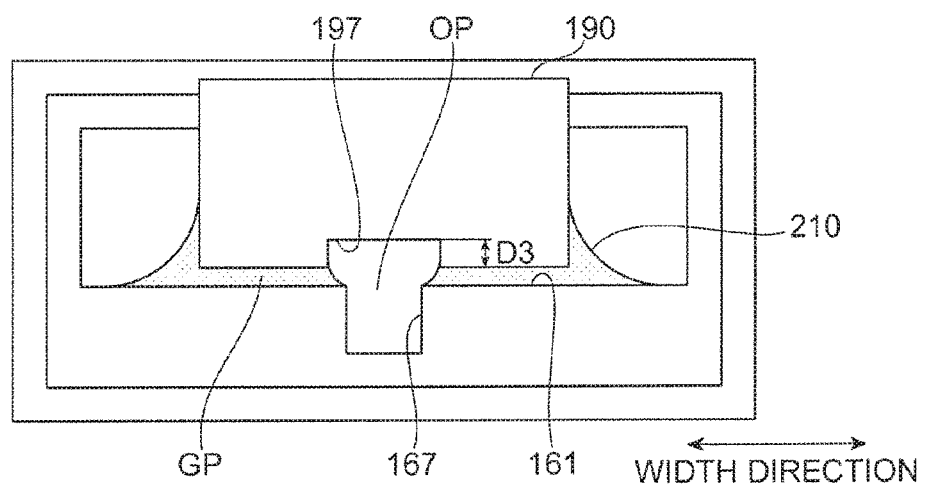
FIG. 7E depicts a simulation result of the flow of the adhesive in a direction perpendicular to the waveguide cores with the grooves according to a modification of an embodiment of the present invention.

FIG. 7A depicts a configuration for simulation of fluid dynamics of the adhesive 210. FIG. 7B depicts a simulation result of the flow of the adhesive 210 in a direction parallel to the waveguide cores WG without the grooves 197 according to a comparative example. FIG. 7C depicts a simulation result of the flow of the adhesive 210 in a direction perpendicular to the waveguide cores WG without the grooves 197 according to the comparative example. FIG. 7D depicts a simulation result of the flow of the adhesive 210 in a direction parallel to the waveguide cores WG with the grooves 197 according to a modification of an embodiment or the present invention. FIG. 7E depicts a simulation result of the flow of the adhesive 210 in a direction perpendicular to the waveguide cores WG with the grooves 197 according to a modification of an embodiment of the present invention.

An explanation is given about the simulation of fluid dynamics of the adhesive 210 around the grooves 197. Each groove 197 has a square shape (refer to FIG. 6). The simulation of fluid dynamics is conducted in a two dimensional flow.

As shown in FIG. 7A, the general configuration for the simulation includes the substrate side component 190 and the waveguide layer 161 provided with the mirror cavities 167. The substrate side component 190 and the waveguide layer 161 are provided in the atmosphere. In the initial state, the adhesive 210 in a fluidized state is enclosed in fields on both sides of the substrate side component 190, and then to start to flow from the enclosed fields.

The properties of the adhesive 210 in a fluidized state are as follows: the density is $10^3$ kg/m$^3$; the viscosity is 0.1 Pa·s (the kinetic viscosity is $10^{-4}$ m$^2$/s); the surface tension is 0.03 N/m. As to the surface properties, the contact angle is 24 degrees. The depth of the groove 197 of FIGS. 7D and 7E is 30 um (micro meter).

As shown in FIGS. 7B and 7C, the simulation results without the grooves 197 indicate that the adhesive 210 may flow into the mirror cavities 167 (refer to arrows A1 and A2). In other words, the adhesive 210 will eventually (for example, in more than 5 seconds) fall into the mirror cavities 167. On the other hand, as shown in FIGS. 7D and 7E, the simulation results with the grooves 197 indicate that the adhesive 210 does not flow into the mirror cavities 167. According to this simulation, providing the grooves 197 on the substrate side component 190 may prevent the adhesive 210 from flowing into the mirror cavities 167.

Figure 8B:
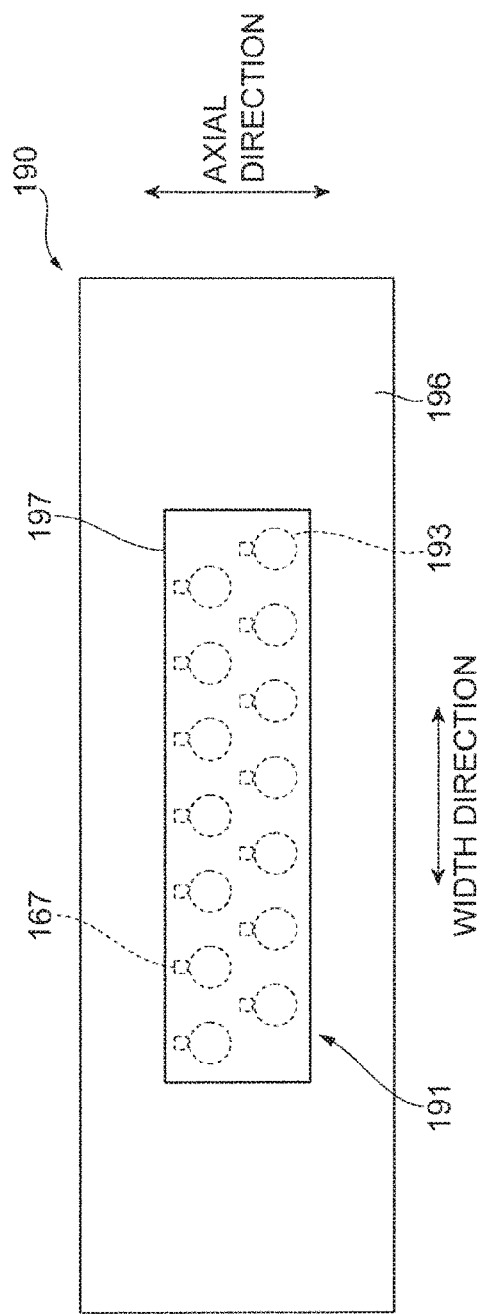
Figure 8C:
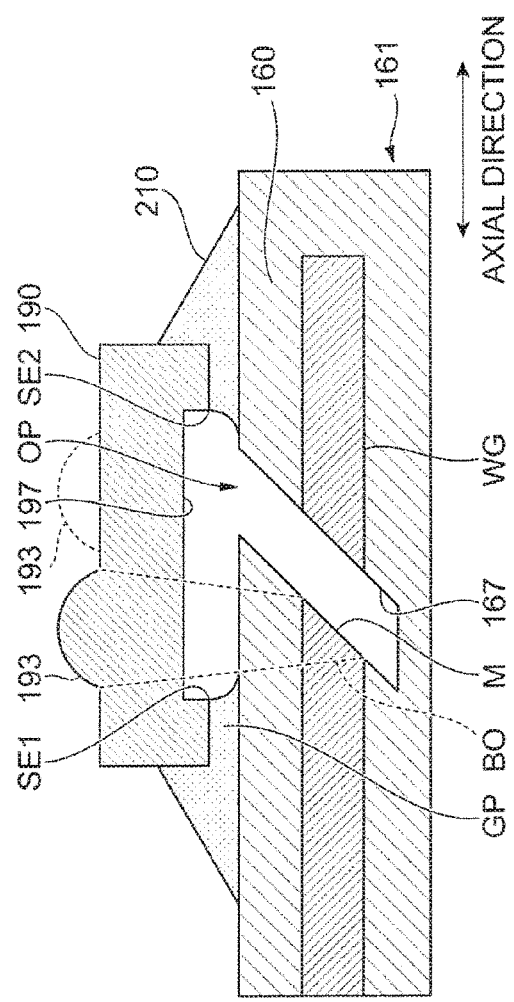
FIGS. 8C, 8D and 8E depict a side view of an area around the mirror cavities according to the modifications of an embodiment of the present invention.
Figure 8D:
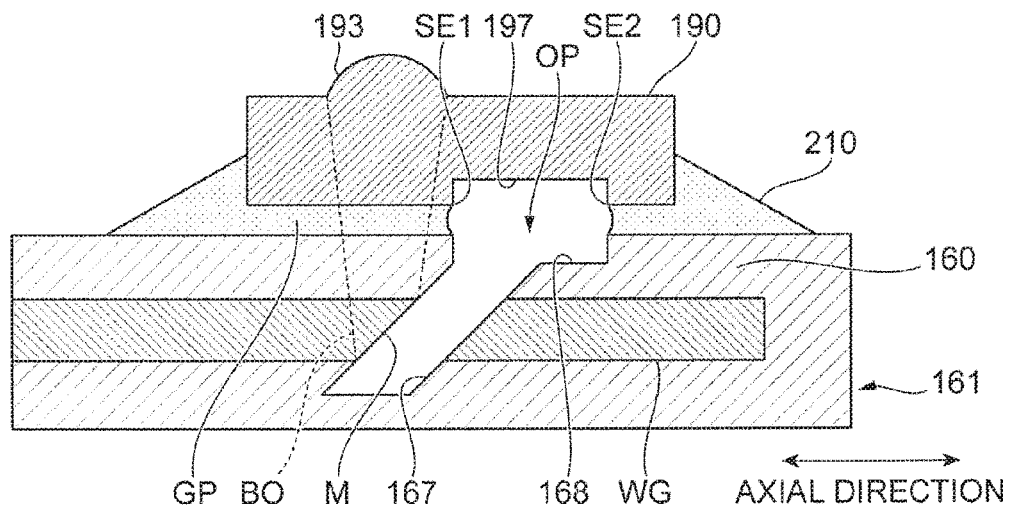
Figure 8E:
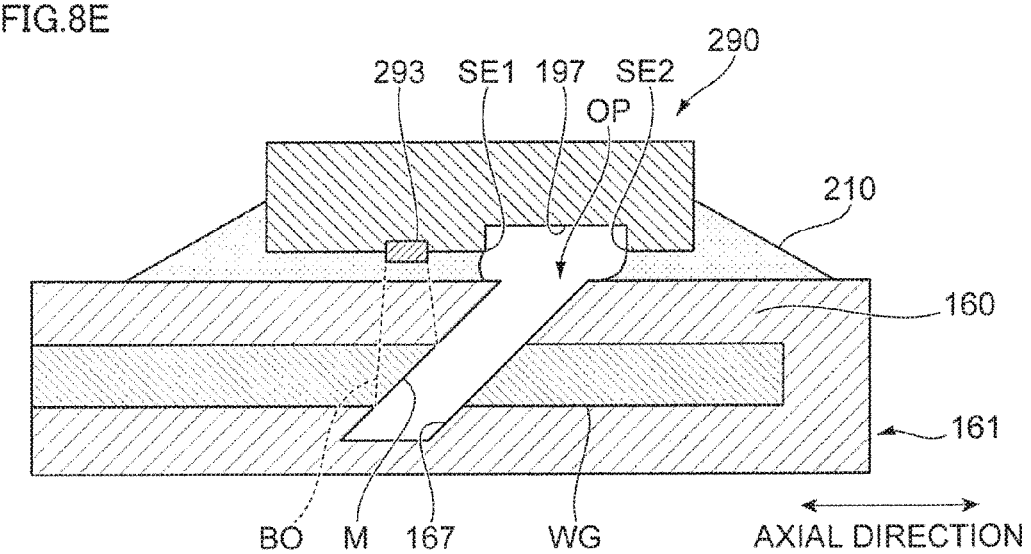

FIGS. 8A and 8B depict a bottom view of the substrate side component 190 according to a modification of an embodiment of the present invention. FIGS. 8C, 8D and 8E depict a side view of an area around the mirror cavities 167 according to a modification of an embodiment.

As shown in FIG. 8A, the grooves 197 may extend over the entire length in the longitudinal direction of the substrate side component 190. In the modification, the substrate side component 190 is provided without the second support portions 195 (refer to FIG. 3A) so that the grooves 197 may be linearly extended on the bottom surface of the substrate side component 190.

As shown in FIGS. 8B and 8C, the groove 197 may be formed with a wider width to cover all areas provided with the microlenses 193. In the modification, the groove 197 extends across the beam outline BO. More specifically, as shown in FIG. 8C, the first groove edge SE1 and the second groove edge SE2 may be arranged opposite to each other across the beam outline BO. Although the light beam traverses the air-material interfaces twice, causing reflection loss in this configuration, a portion of the volume of the gap GP is filled with the adhesive 210, providing better mechanical stability than side filling.

As shown in FIG. 8D, in addition to the grooves 197, waveguide grooves 168 may be provided on the top surface of the waveguide layer 161. The waveguide grooves 168 may be opposed to the grooves 197. The waveguide grooves 168 and the grooves 197 may enlarge the height of the gap GP to prevent the adhesive 210 from flowing into the mirror cavities 167.

The above mentioned configurations may also be applicable to any optical component (e.g., optoelectronic chip), such as a vertical cavity surface emitting laser (VCSEL) chip, a photodiode (PD) chip, a lens array component, etc. For example, as shown in FIG. 8E, a VCSEL chip 290 including an active area 293 may be directly mounted on the waveguide layer 161. The VCSEL chip 290 may be provided with the grooves 197 on the bottom surface of the VCSEL chip 290. The grooves 197 may prevent the adhesive 210 from flowing into the mirror cavities 167. Note that the above mentioned configurations may also be applicable to any component. For example, a first component may be provided with a cavity on a first surface of the first component. A second component may be on the first component with a recess on the bottom surface of the second component. The recess 197 may prevent the fluid 210 from flowing into the cavity 167.

FIGS. 9A to 9F depict a cross-sectional view of the groove 197 according to another modification in accordance with an embodiment of the present invention. The cross-sectional shape of the groove 197 may not be limited to the rectangular shape as shown in FIG. 5C as long as the groove enlarges the height of the gap GP.

As shown in FIGS. 9A and 9B, the cross-sectional shape of the groove 197 may be a trapezoid shape. In the modification shown in FIG. 9A, the length L1 of the groove 197 in the axial direction increases gradually from the bottom of the groove 197 to the opening of the groove 197. In the modification shown in FIG. 9B, the length L1 of the groove 197 in the axial direction decreases gradually from the bottom of the groove 197 to the opening of the groove 197.

As shown in FIG. 9C, the cross-sectional shape of the groove 197 may be a curved shape. As shown in FIG. 9D, the cross-sectional shape of the groove 197 may be a generally rectangular shape with round corners. As shown in FIG. 9E, the cross-sectional shape of the groove 197 may be a V-shape. As shown in FIG. 9F, the groove 197 may be provided with an uneven bottom.

Figure 10A:
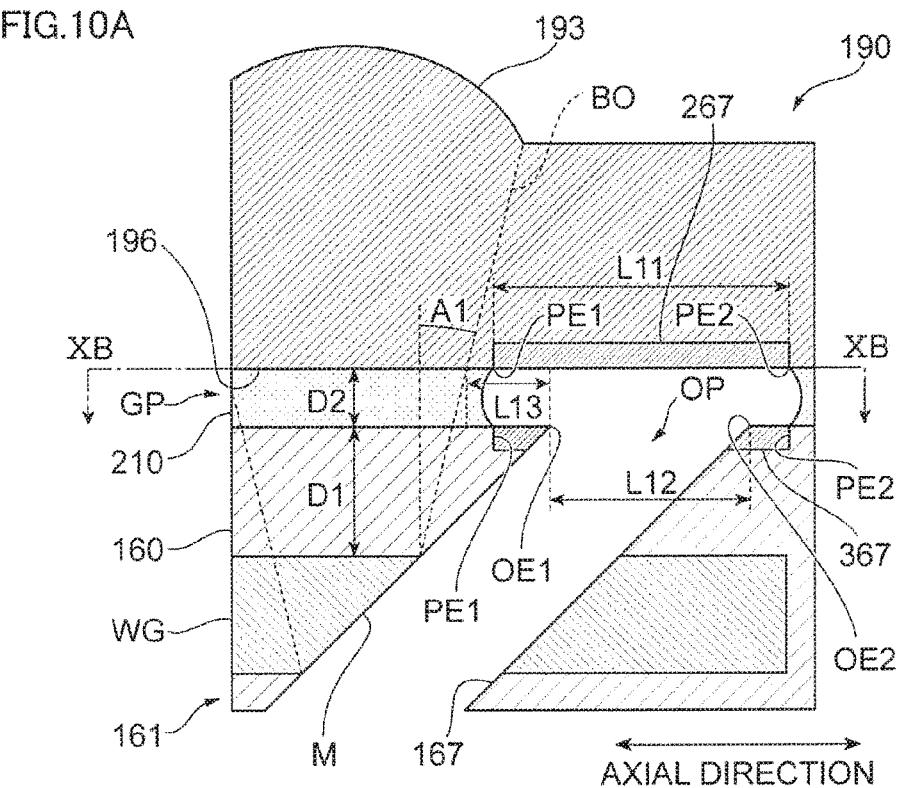
FIG. 10A is a side view of an area around hydrophobic areas according to an embodiment of the present invention.
Figure 10B:
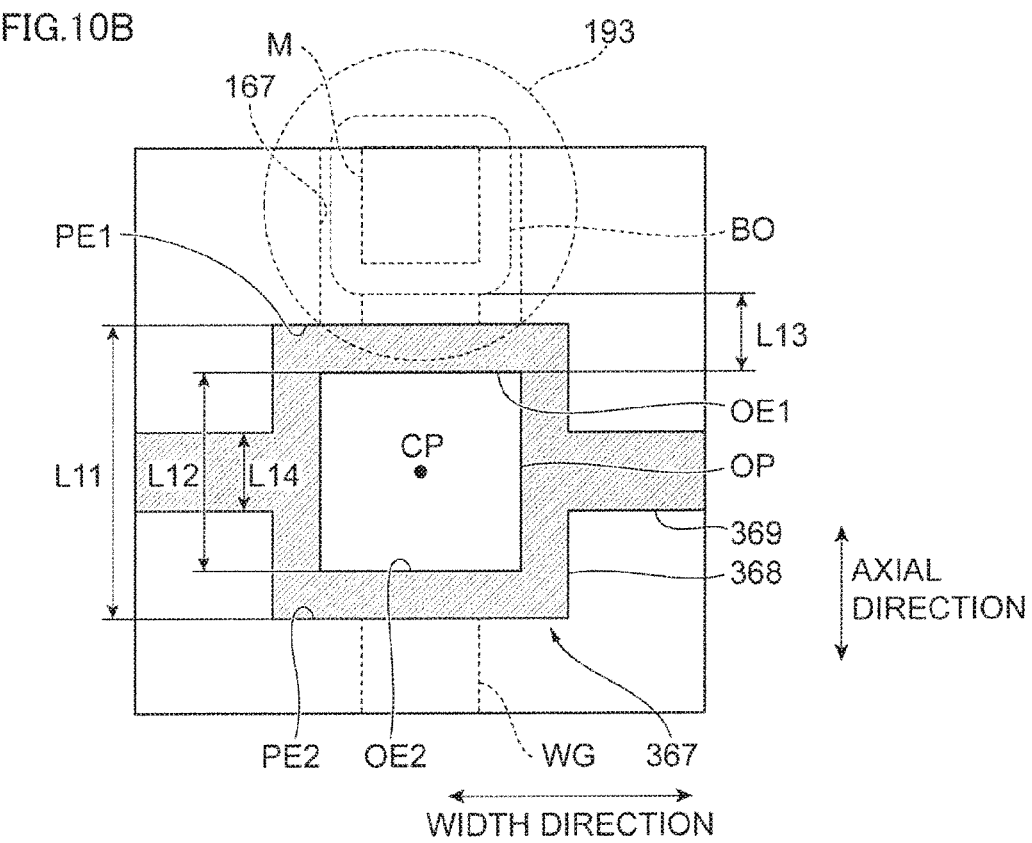
FIG. 10B is a cross-sectional view taken along the line XB-XB in FIG. 10A of the present invention.

FIG. 10A depicts a side view of an area around hydrophobic areas 267 and 367 according to another embodiment. FIG. 10B depicts a cross-sectional view taken along the line XB-XB in FIG. 10A. FIG. 11A depicts a top view of the waveguide layer 161 according to the embodiment of FIG. 10A. FIG. 11B depicts a bottom view of the substrate side component 190 according to the embodiment of FIG. 10A.

As shown in FIGS. 10A and 10B, the substrate side component 190 and the waveguide layer 161 may include hydrophobic areas 267 and 367, respectively. The hydrophobic area 267 may be provided on the bottom surface of the substrate side component 190 in the central area 196. The hydrophobic area 367 may be provided on the top surface of the waveguide layer 161 around the opening OP of each mirror cavity 167. In the embodiment, the hydrophobic areas 267 and 367 may have a corresponding shape and are opposed to each other.

The hydrophobic areas 267 and 367 are examples of a predetermined portion arranged around the cavity 167. The hydrophobic areas 267 and 367 are an example of a treated surface having a poor wettability to a liquid adhesive than other areas surrounding the treated surface.

As shown in FIG. 11A, the hydrophobic area 367 of the waveguide layer 161 may include main areas 368 and band areas 369. Each of the main areas 368 may have a generally square shape with its middle part cut off as the opening OP. In other words, each of the main areas 368 surrounds the opening OP of each mirror cavity 167. The band areas 369 may extend along the width direction between the edges of the substrate side component 190. In other words, the band areas 369 may extend across the main areas 368 to connect them.

As shown in FIG. 11B, the hydrophobic area 267 of the substrate side component 190 may include main areas 268 and band areas 269. Each of the main areas 268 may have a generally square shape. Note that the main area 268 is provided without its middle part cut off as the opening OP. Each of the main areas 268 may be opposed to the opening OP of each mirror cavity 167. As shown in FIG. 11B, the main areas 268 on the substrate side component 190 may cover the opening OP of the mirror cavities 167 in a top view. The band areas 269 may extend along the width direction between the edges of the substrate side component 190. In other words, the band areas 269 may extend across the main areas 268 to connect them.

Next, an explanation is given about the dimension of the hydrophobic areas 267 and 367 in the embodiment with reference to FIGS. 10A and 10B. In the following explanation, the edges of the hydrophobic areas 267 and 367 (main areas 268 and 368) in the axial direction are hereinafter called a first hydrophobic area edge PE1 and a second hydrophobic area edge PE2, respectively.

In the embodiment, the length L11 of the main areas 268 and 368 in the axial direction may be longer than the length L12 of the opening OP or the length L14 of the band area 369 in the axial direction.

The length L12 may be 10 um to 100 um (micrometer), preferably 25 um to 75 um, and more preferably 45 um to 55 um. The length L11 may be 10 um to 100 um, preferably 30 um to 80 um, and more preferably 60 um to 70 um. In the embodiment, each of the main areas 268 and 368 may cover the opening OP to some extent (e.g., 10%), or fully cover the opening OP (e.g., more than 110%).

In the axial direction, the first hydrophobic area edge PE1 may be on the farther side from the center CP than the first cavity edge OE1. The second hydrophobic area edge PE2 may be on the farther side from the center CP than the second cavity edge OE2.

As shown in FIG. 10A, the light reflected at the mirror M is directed towards the microlens 193 while expanding the beam outline BO. In the embodiment, to prevent the light from passing the hydrophobic areas 267 and 367, the first hydrophobic area edge PE1 is on the outside of the beam outline BO. In other words, the hydrophobic areas 267 and 367 are provided on a position separated from the beam outline BO.

Here, there is an approximately 10 um (micro meter) margin to offset the first hydrophobic area edge PE1 towards the beam outline BO. In other words, the length L13 between the first cavity edge OE1 and the beam outline BO on a plane including the bottom surface of the central area 196 is approximately 10 um. The dimensions of this configuration are the same as the above described configuration shown in FIG. 5B.

The hydrophobic areas 267 and 367 are an example of selected areas to which a hydrophobic surface treatment is applied. The hydrophobic areas 267 and 367 may be provided just around the opening OP so that the adhesive 210 fills in the entire volume in which the light traverses.

In the embodiment, a contact angle of the hydrophobic areas 267 and 367 may be larger than that of an area surrounding the hydrophobic area 267 on the bottom surface of the substrate side component 190 or an area surrounding the hydrophobic area 367 on the top surface of the waveguide layer 161. In one example, the contact angle of the hydrophobic areas 267 and 367 may be 83 degrees and the contact angle of the surrounding area may be 7 degrees. In this example, the hydrophobic areas 267 and 367 are a fluoride hydrophobic coating and the adhesive 210 is UV curing resin having viscosity of 0.022 Pa·s.

However, the configuration of the hydrophobic areas 267 and 367 is not limited to this. The hydrophobic areas 267 and 367 may have a nano-structure. The nano-structure may be formed with plasma treatment, nanoimprint lithography, or ion-implantation process. For example, the nano-structure may include nanometer-sized pins which are aligned perpendicular to the surface of the substrate side component 190 or the waveguide layer 161. Alternatively, the hydrophobic areas 267 and 367 may be a heat curing adhesive.

In the embodiment, an improved control of capillary flow of the adhesive 210 may lead to a higher yield in the assembling process (lens assembling process) of the optical communication system 1. When the adhesive 210 infiltrates the gap GP in the assembling process, the band areas 369 may guide any air in the gap GP towards the outside of the gap GP in the width direction. This may prevent the pressured (heated) air in the gap GP from causing the poor bonding between the substrate side component 190 and the waveguide layer 161.

Next, an explanation is given with respect to the fabrication process of the waveguide layer 161 and the substrate side component 190 according to an embodiment.

Referring to FIGS. 12A and 12B, a top view and a side view, respectively, of the waveguide layer 161 at the first step of the fabrication process according to the second embodiment are shown. At this step, the waveguide layer 161 may be prepared with conventional techniques. Note that the mirror cavities 167 have not been provided on the surface of the waveguide layer 161.

Referring to FIGS. 13A and 13B, a top view and a side view, respectively, of the waveguide layer 161 at the second step of the fabrication process are shown. At this step, pattern masks PM are formed on the top surface of the waveguide layer 161. The pattern masks PM are disposed with an exposure area EA left between the pattern masks PM. The exposure area EA defines a shape of the hydrophobic area 367. Note that use of the pattern masks PM enables a precise selection of areas of the waveguide layer 161 to be treated.

Referring to FIGS. 14A and 14B, a top view and a side view, respectively, of the waveguide layer 161 at the third step of the fabrication process are shown. At this step, hydrophobic surface treatment is applied (e.g., splayed) over the entire surface of the waveguide layer 161. In other words, the hydrophobic area 367 may be formed on the exposure area EA and the pattern masks PM.

Figure 15A:
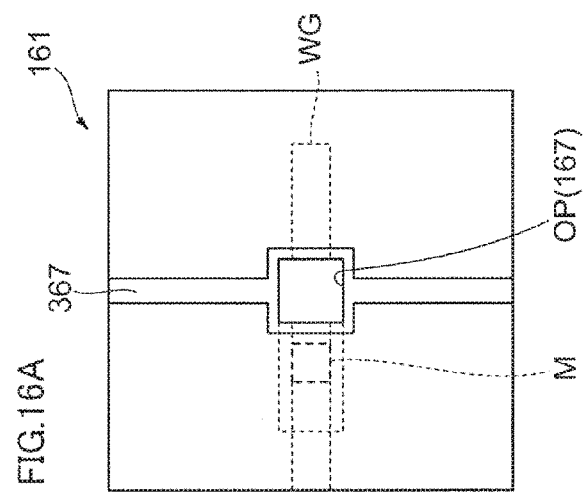
FIGS. 15A and 15B depict a top view and a side view, respectively, of the waveguide layer during the fabrication process of the present invention.
Figure 15B:
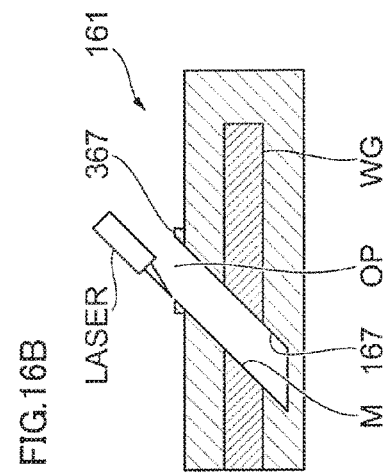

Referring to FIGS. 15A and 15B, a top view and a side view, respectively, of the waveguide layer 161 at the fourth step of the fabrication process are shown. At this step, the pattern masks PM are removed to leave the hydrophobic area 367 on the waveguide layer 161.

Figure 16A:
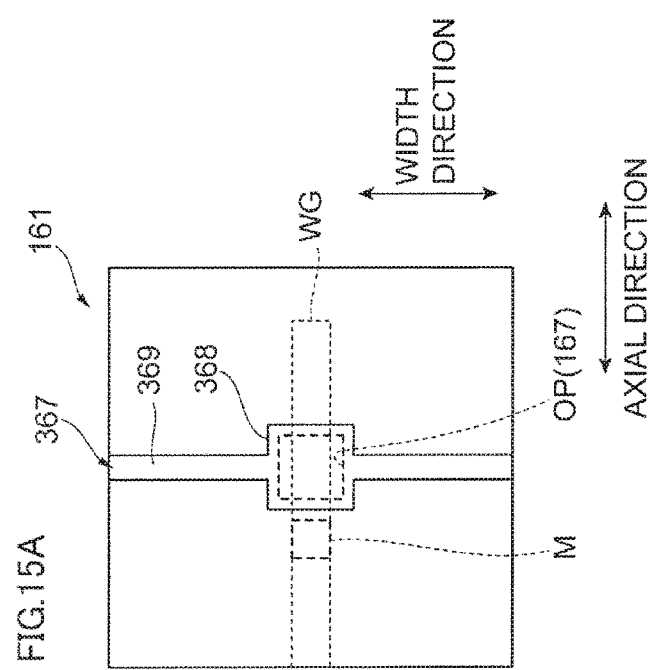
FIGS. 16A and 16B depict a top view and a side view, respectively, of the waveguide layer during the fabrication process of the present invention.
Figure 16B:
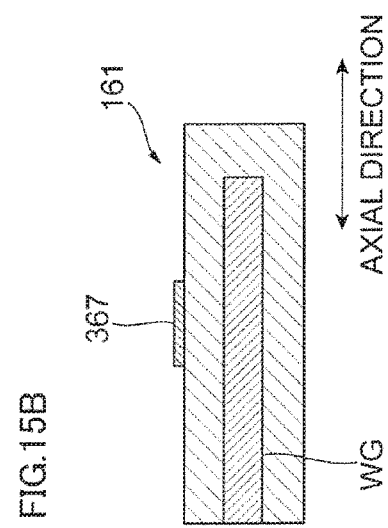

Referring to FIGS. 16A and 16B, a top view and a side view, respectively, of the waveguide layer 161 at the fifth step of the fabrication process are shown. At this step, the mirror cavities 167 are formed by laser processing.

Figure 17A:
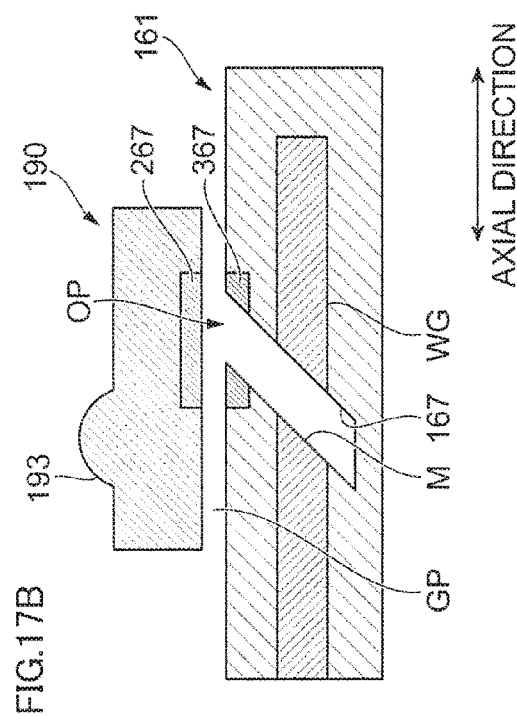
FIGS. 17A, 17B and 17C depict a top view, a side view, and a wide range top view, respectively, of the waveguide layer during the fabrication process of the present invention.
Figure 17C:
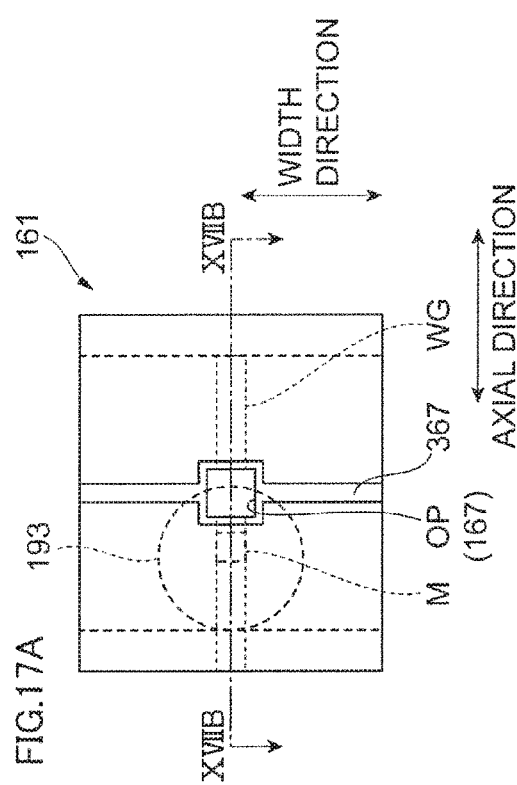
Figure 17B:
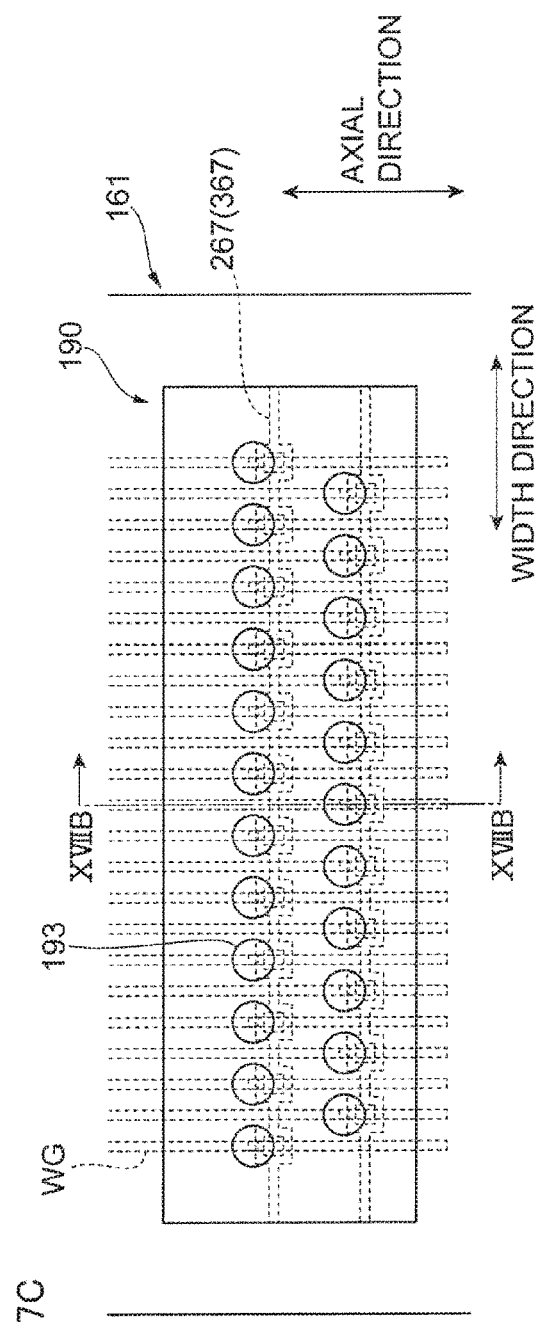

Referring to FIGS. 17A, 17B and 17C, a top view, a side view, and a wide range top view, respectively, of the waveguide layer 161 are shown at the sixth step of the fabrication process. In the figures, pedestals are not shown. Note that the hydrophobic area 267 is assumed to have been provided on the bottom surface of the substrate side component 190 using the pattern masks PM, for example. At this step, the substrate side component 190 is mounted on the waveguide layer 161. The gap GP is formed between the bottom surface of the substrate side component 190 and the top surface of the waveguide layer 161.

Figure 18A:
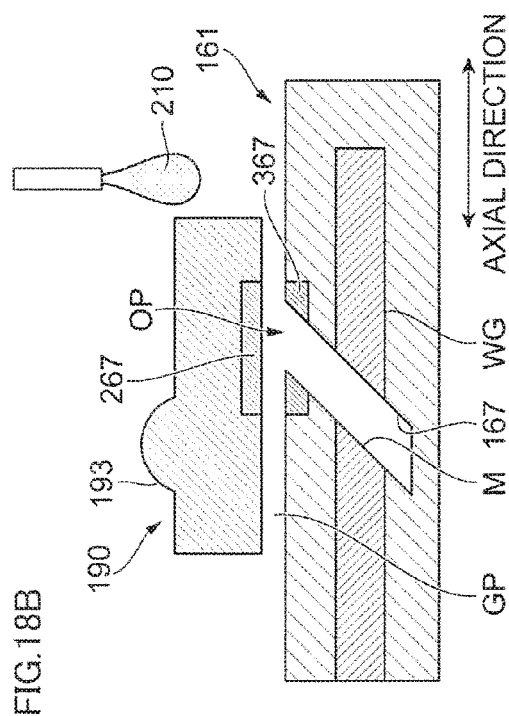
FIGS. 18A, 18B and 18C depict a top view, a side view, and a wide range top view, respectively, of the waveguide layer during the fabrication process of the present invention.
Figure 18B:
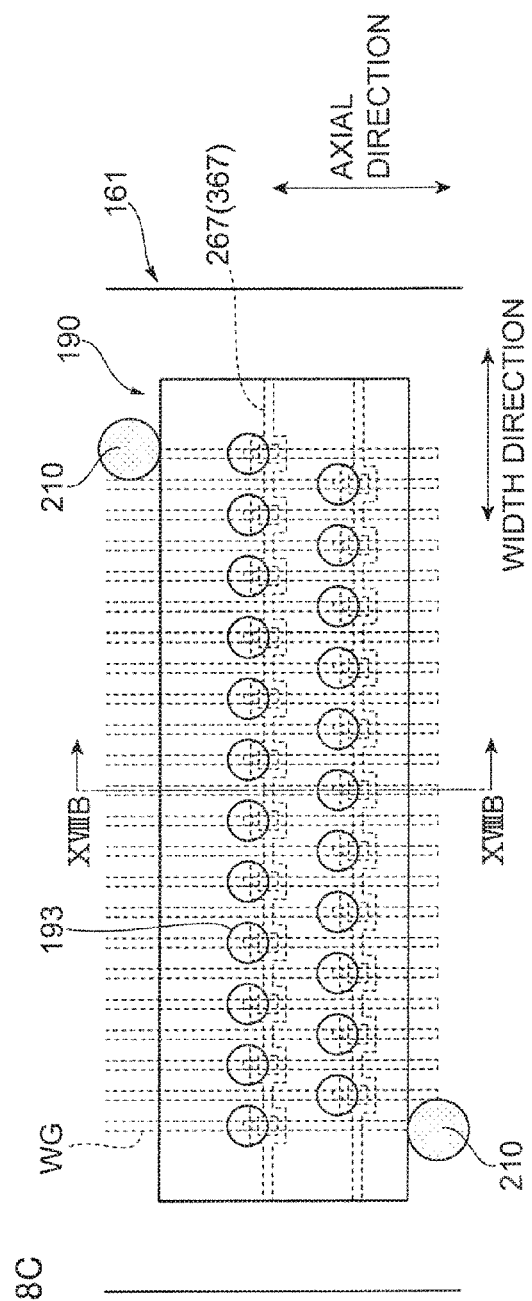
Figure 18C:
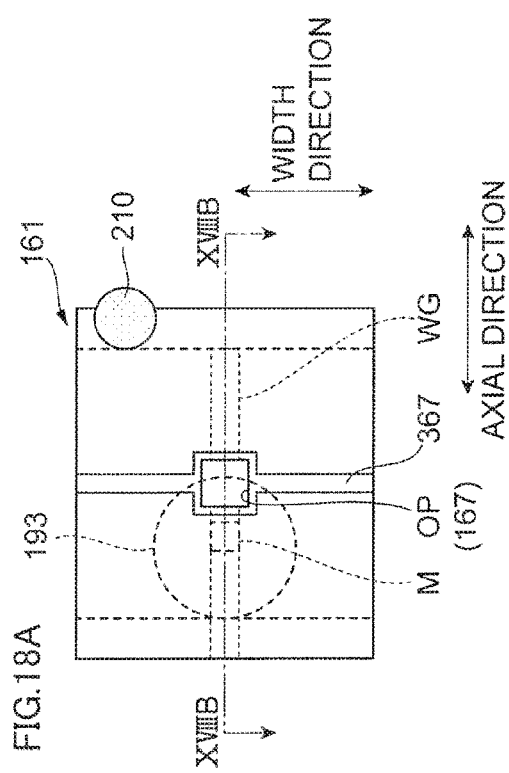

Referring to FIGS. 18A, 18B and 18C, a top view, a side view, and a wide range top view, respectively, of the waveguide layer 161 are shown at the seventh step of the fabrication process. At this step, the adhesive 210 is applied to sides of the substrate side component 190. In the shown example, the adhesive 210 is applied on two points arranged opposite to each other across the substrate side component 190.

Referring to FIGS. 19A, 19B and 19C, a top view, a side view, and a wide range top view, respectively, of the waveguide layer 161 are shown at the eighth step of the fabrication process. At this step, the adhesive 210 distributes through the gap GP due to capillary effect. The adhesive 210 is then cured by UV radiation so that the substrate side component 190 is fixed to the waveguide layer 161.

FIG. 20A depicts a configuration for simulation of fluid dynamics of the adhesive 210. FIG. 20B depicts a simulation result of the flow of the adhesive 210 in a direction parallel to the waveguide cores WG without the hydrophobic areas 267 and 367 according to a comparative example. FIG. 20C depicts a simulation result of the flow of the adhesive 210 in a direction parallel to the waveguide cores WG with the hydrophobic areas 267 and 367 according to an embodiment of the present invention.

An explanation is given about the simulation of fluid dynamics of the adhesive 210 around the hydrophobic areas 267 and 367. The simulation of fluid dynamics is conducted in a two dimensional flow.

As shown in FIG. 20A, the general configuration for the simulation includes the substrate side component 190 and the waveguide layer 161 provided with the mirror cavities 167. The substrate side component 190 and the waveguide layer 161 are provided in the atmosphere. In the initial state, the adhesive 210 in a fluidized state is enclosed in fields on both sides of the substrate side component 190, and then start to flow from the enclosed fields.

The properties of the adhesive 210 in a fluidized state are as follows: the density is $10^3$ kg/m$^3$; the viscosity is 0.1 Pa·s (the kinetic viscosity is $10^{-4}$ m$^2$/s); the surface tension is 0.03 N/m. As to the surface properties, the contact angle of a treated surface (e.g., the hydrophobic areas 267 and 367) is 80 degrees, and an untreated surface (e.g., the bottom surface of the waveguide layer 161 except the hydrophobic area 267, and the top surface of the waveguide layer 161 except the hydrophobic area 367) is 7 degrees. The first hydrophobic area edge PE1 is on a position separated by 10 um (micro meter) from the opening OP. The second hydrophobic area edge PE2 is on a position separated by 20 um (micro meter) from the opening OP.

As shown in FIG. 20B, the simulation results without the hydrophobic areas 267 and 367 indicate that the adhesive 210 may flow into the mirror cavities 167 (refer to an arrow A3). In other words, the adhesive 210 will eventually (for example, in more than 5 seconds) fall into the mirror cavities 167. On the other hand, as shown in FIG. 20C, the simulation results with the hydrophobic areas 267 and 367 indicate that the adhesive 210 does not flow into the mirror cavities 167. According to this simulation, providing the hydrophobic areas 267 and 367 may prevent the adhesive 210 from flowing into the mirror cavities 167.

Figure 21A:
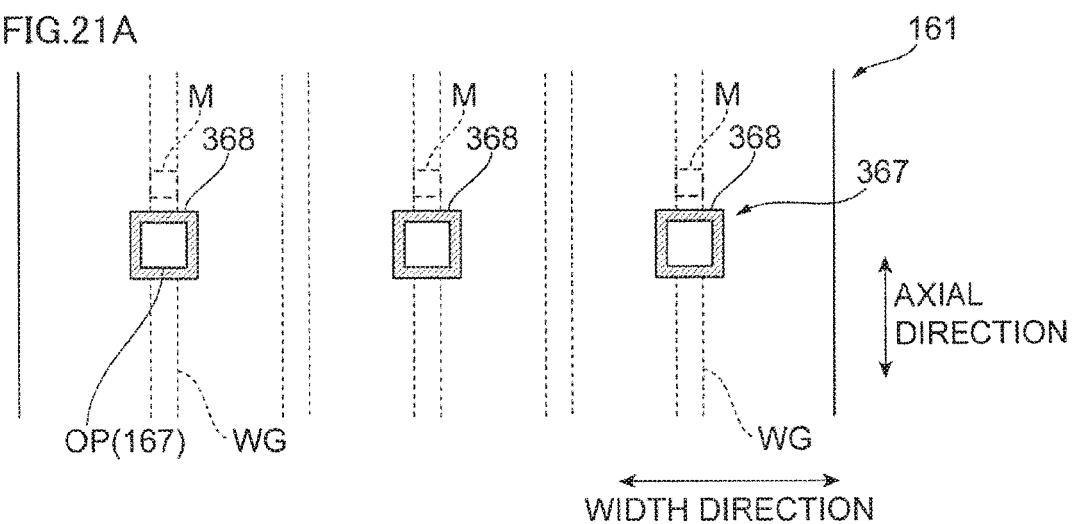
FIG. 21A is a top view of the waveguide layer according to a modification of an embodiment of the present invention.
Figure 21B:
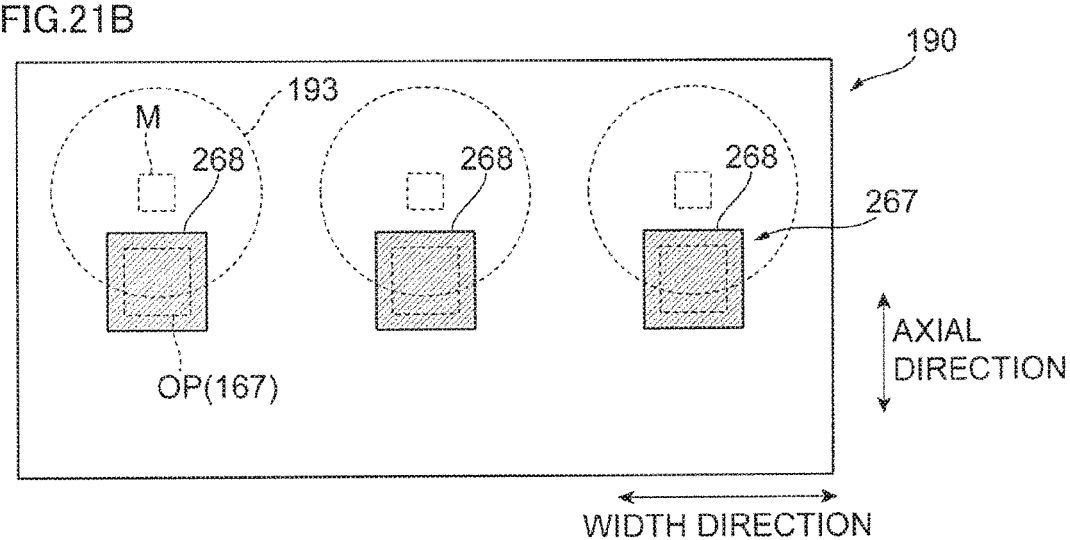
FIG. 21B is a bottom view of the substrate side component according to a modification of an embodiment of the present invention.
Figure 21C:
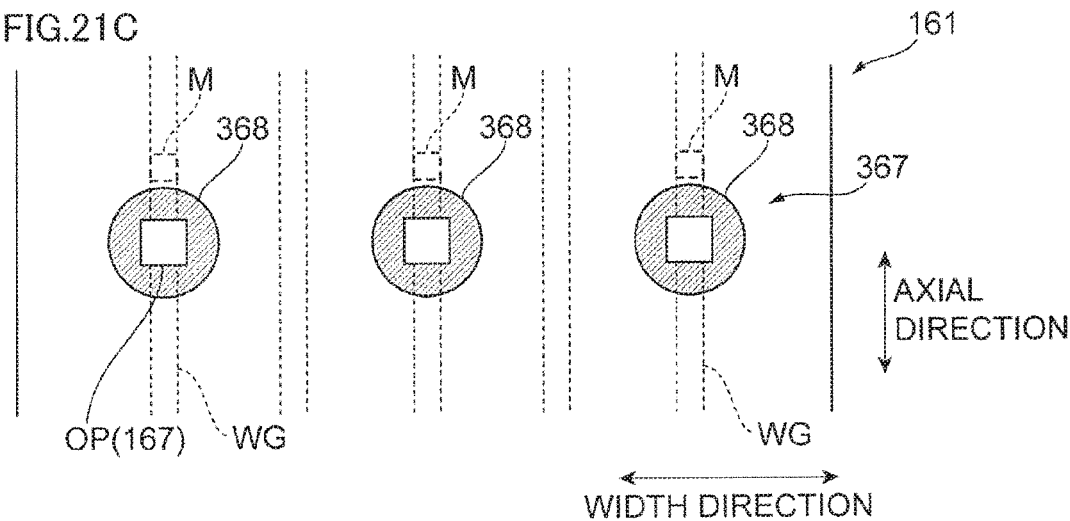
FIG. 21C is a bottom view of the substrate side component according to a modification of an embodiment of the present invention.

FIG. 21A depicts a top view of the waveguide layer 161 according to a modification of an embodiment of the present invention. FIG. 21B depicts a bottom view of the substrate side component 190 according to a modification of an embodiment of the present invention. FIG. 21C depicts a bottom view of the substrate side component 190 according to a modification of an embodiment of the present invention.

The hydrophobic areas 267 and 367 may be provided without the band areas 269 and 369. As shown in FIGS. 21A and 21B, the hydrophobic areas 267 and 367 may be provided with dispersed main areas 268 and 368, respectively.

The hydrophobic areas 267 and 367 may have any shape. As shown in FIG. 21C, the hydrophobic area 367 may be provided with main areas 368 having a round shape.

FIGS. 22A, 22B, 22C, 22D, and 22E depict a side view of the mirror cavities 167 according to several modifications of an embodiment of the present invention.

Figure 22A:
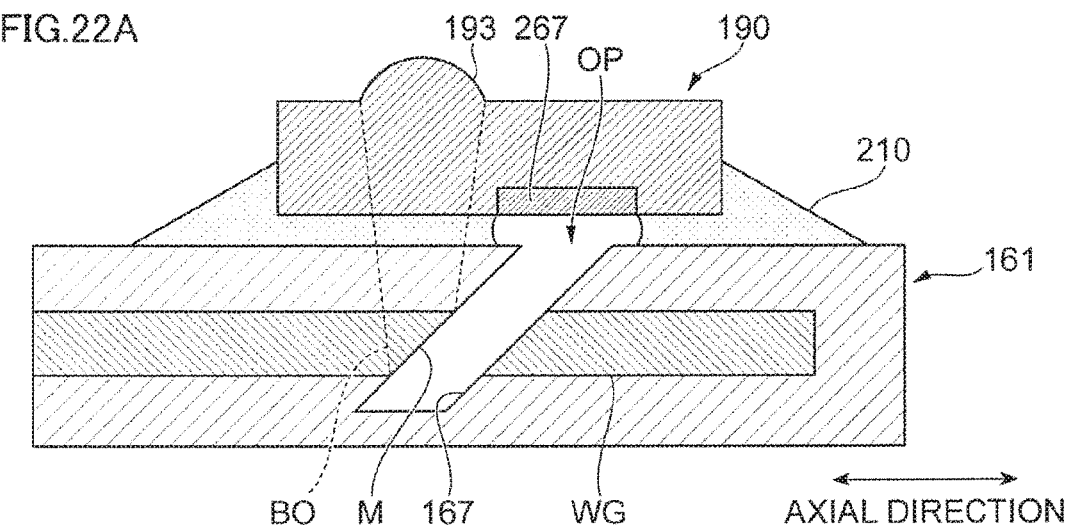
FIGS. 22A, 22B, 22C, 22D, and 22E depict a side view of the mirror cavities according to modifications of an embodiment of the present invention.

One of the hydrophobic areas 267 and 367 may be omitted as long as the other one of the hydrophobic areas 267 and 367 prevents the adhesive 210 from flowing into the mirror cavities 167. For example, as shown in FIG. 22A, the substrate side component 190 may include the hydrophobic area 267, but the waveguide layer 161 may be without the hydrophobic area 367.

Figure 22B:
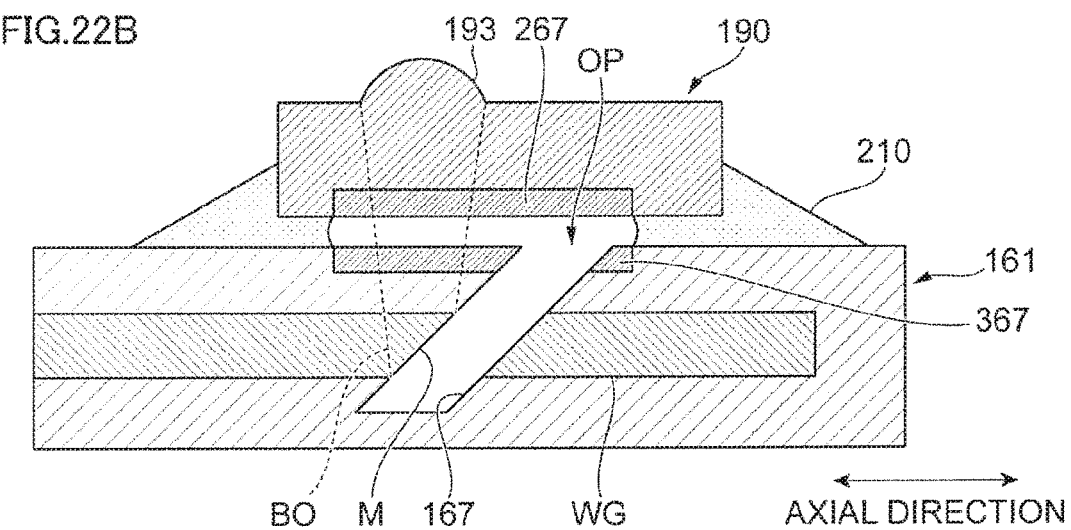

As shown in FIG. 22B, the hydrophobic areas 267 and 367 may be provided on the area enclosing both the opening OP of each mirror cavity 167 and the beam outline BO. Although the light beam traverses the air-material interfaces twice, causing reflection loss in this configuration, a portion (most) of the volume of the gap GP is filled with the adhesive 210 providing better mechanical stability than side filling.

Figure 22C:
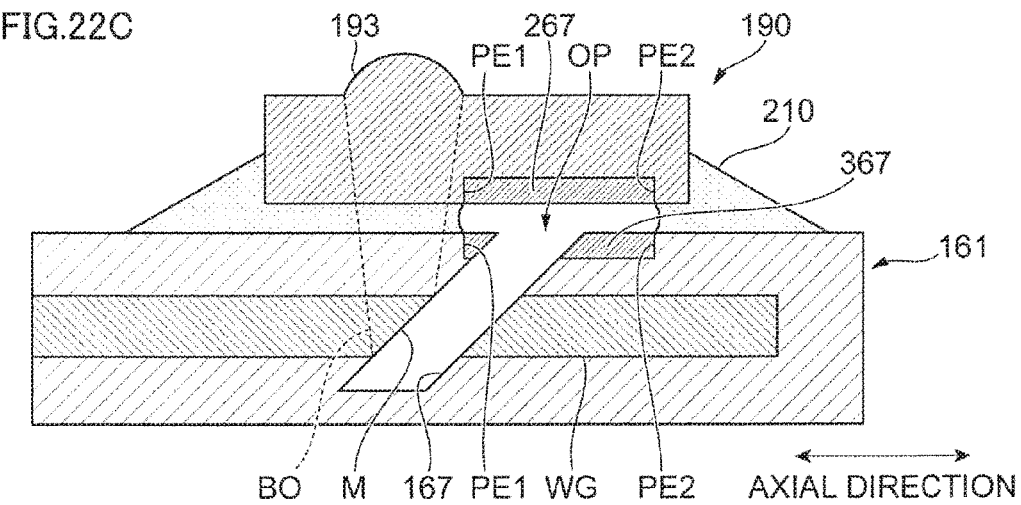

As shown in FIG. 22C, the hydrophobic areas 267 and 367 may surround the opening OP in a position separated from the beam outline BO. The distance from the second hydrophobic area edge PE2 to the opening OP is longer than the distance from the first hydrophobic area edge PE1 to the opening OP. The wide area of the hydrophobic areas 267 and 367 on the second hydrophobic area edge PE2 side prevents the adhesive 210 from infiltrating into the opening OP from the second hydrophobic area edge PE2 side.

Figure 22D:
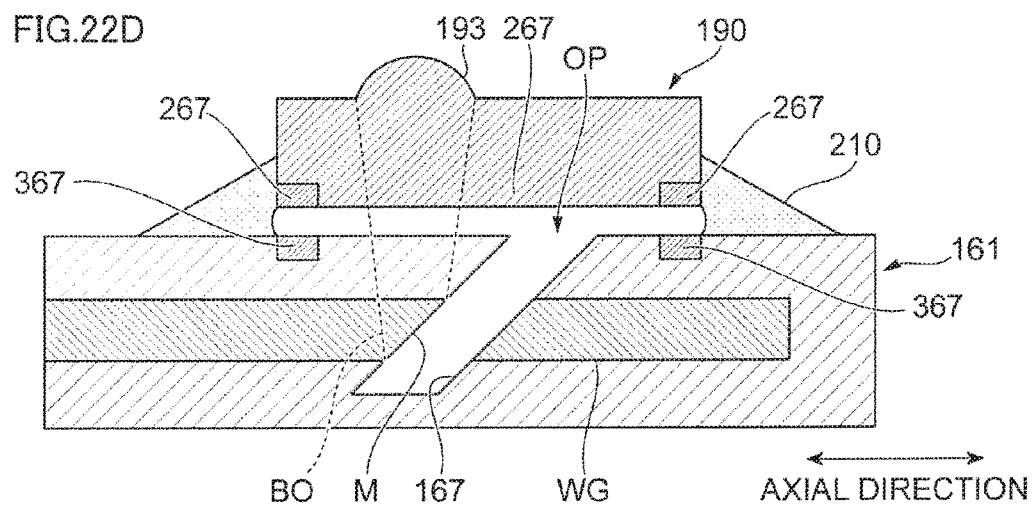

As shown in FIG. 22D, the hydrophobic areas 267 and 367 may be provided around the opening OP of each mirror cavity 167 and the beam outline BO. In other words, the hydrophobic areas 267 and 367 may be provided along edges of the substrate side component 190. This configuration may prevent the light from passing the hydrophobic areas 267 and 367.

Figure 22E:
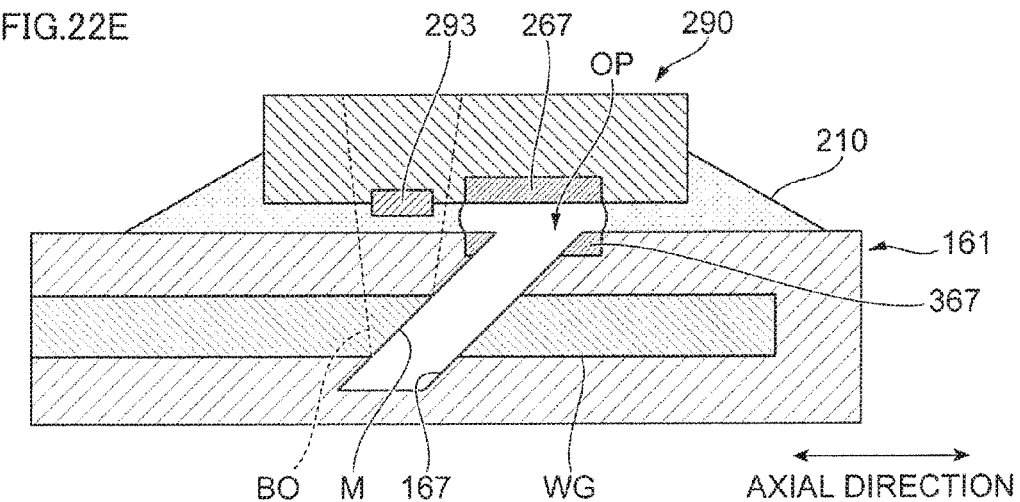

The above described configurations may also be applicable to any optical components (e.g., optoelectronic chip), such as a VCSEL chip, a PD chip, a lens array component. For example, as shown in FIG. 22E, the VCSEL chip 290 including an active area 293 may be directly mounted on the waveguide layer 161. The VCSEL chip 290 may be provided with the hydrophobic area 267 on the bottom surface of the VCSEL chip 290. The hydrophobic areas 267 and 367 prevents the adhesive 210 from flowing into the mirror cavities 167.

FIGS. 23A and 23B depict a side view of the mirror cavities 167 according to another modification of an embodiment of the present invention. As shown in FIG. 23A, a combination of the hydrophobic area 367 on the waveguide layer 161 and the grooves 197 on the substrate side component 190 may be provided to prevent the adhesive 210 from flowing into the mirror cavities 167. Further, as shown in FIG. 23B, protrusions 199 may be provided on the substrate side component 190 (or the waveguide layer 161) to prevent the adhesive 210 from flowing into the mirror cavities 167.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optical structure, comprising:
   a substrate including a cavity on a first surface of the substrate;
   an optical component on the substrate; and
   an adhesive infiltrating into a gap between the substrate and the optical component to fix the optical component to the substrate, wherein:
   the optical component includes a recess on a second surface of the optical component, the second surface being opposed to the substrate; and
   the recess covers an opening of the cavity of the substrate, the recess being free of the adhesive.

2. The optical structure of claim 1, wherein:
   the substrate includes a waveguide core and the cavity intersects the waveguide core; and
   an interface between the waveguide core and the cavity reflects a light passing through the waveguide core.

3. The optical structure of claim 2, wherein the cavity is filled with gas and the light is reflected at the interface by total internal reflection.

4. The optical structure of claim 2, wherein:
   a plurality of waveguide cores are arranged substantially in parallel with each other;
   the optical component includes a plurality of lenses; and
   each of the plurality of lenses is aligned with a corresponding one of the plurality of waveguide cores.

5. The optical structure of claim 4, wherein:
   the light traveling between one of the plurality of lenses and the corresponding one of the plurality of waveguide cores traverses the gap; and the adhesive fills a light path of the light included in the gap.

6. The optical structure of claim 4, wherein the recess is located apart from a light path of the light traveling between one of the plurality of lenses and the corresponding one of the plurality of waveguide cores.

7. The optical structure of claim 1, wherein the adhesive fills at least a portion of the gap surrounding the recess.

8. The optical structure of claim 1, wherein:
the adhesive infiltrates into the gap due to capillary effect; and
the recess prevents the adhesive from flowing into the cavity.

9. A fluid control structure, comprising:
a first component including a cavity on a first surface of the first component;
a second component on the first component; and
a fluid infiltrating into a gap between the first component and the second component, wherein:
the second component includes a recess on a second surface of the second component, the second surface being opposed to the first component; and
the recess covers an opening of the cavity of the first component, the recess being free of the adhesive.

10. A method for fabricating an optical structure, comprising:
forming a substrate with a cavity on a first surface of the substrate;
forming an optical component with a recess on a second surface of the optical component;
mounting the optical component on the substrate, the second surface of the optical component being opposed to the first surface of the substrate, the recess covering an opening of the cavity of the substrate;
applying an adhesive between the substrate and the optical component such that the adhesive infiltrates into a gap between the substrate and the optical component;
preventing the adhesive from flowing into the cavity with the recess, the recess being free of the adhesive; and
fixing the optical component to the substrate with the adhesive.

11. The optical structure of claim 1, wherein the recess includes at least one groove in the second surface of the optical component corresponding to a position of the cavity, the at least one groove extending along a length of the optical component such that the at least one groove increases a height of the gap over the opening of the cavity.

12. The optical structure of claim 11, wherein the at least one groove has a shape selected from the group consisting of a trapezoid, a curve, a rectangle having rounded corners, a v-shape, and an uneven bottom.

13. The optical structure of claim 1, wherein the recess includes a groove portion in the second surface of the optical component corresponding to a position of the cavity such that the groove portion increases a height of the gap over the opening of the cavity.

14. The optical structure of claim 1, wherein the substrate includes a waveguide groove adjacent to and extending from the opening of the cavity.

15. The optical structure of claim 14, wherein the waveguide groove is free of the adhesive.

16. The optical structure of claim 1, wherein the substrate includes a hydrophobic area adjacent to and extending from the opening of the cavity, the hydrophobic area including a material having poor wettability to prevent the adhesive from entering the cavity.

* * * * *